May 16, 1961

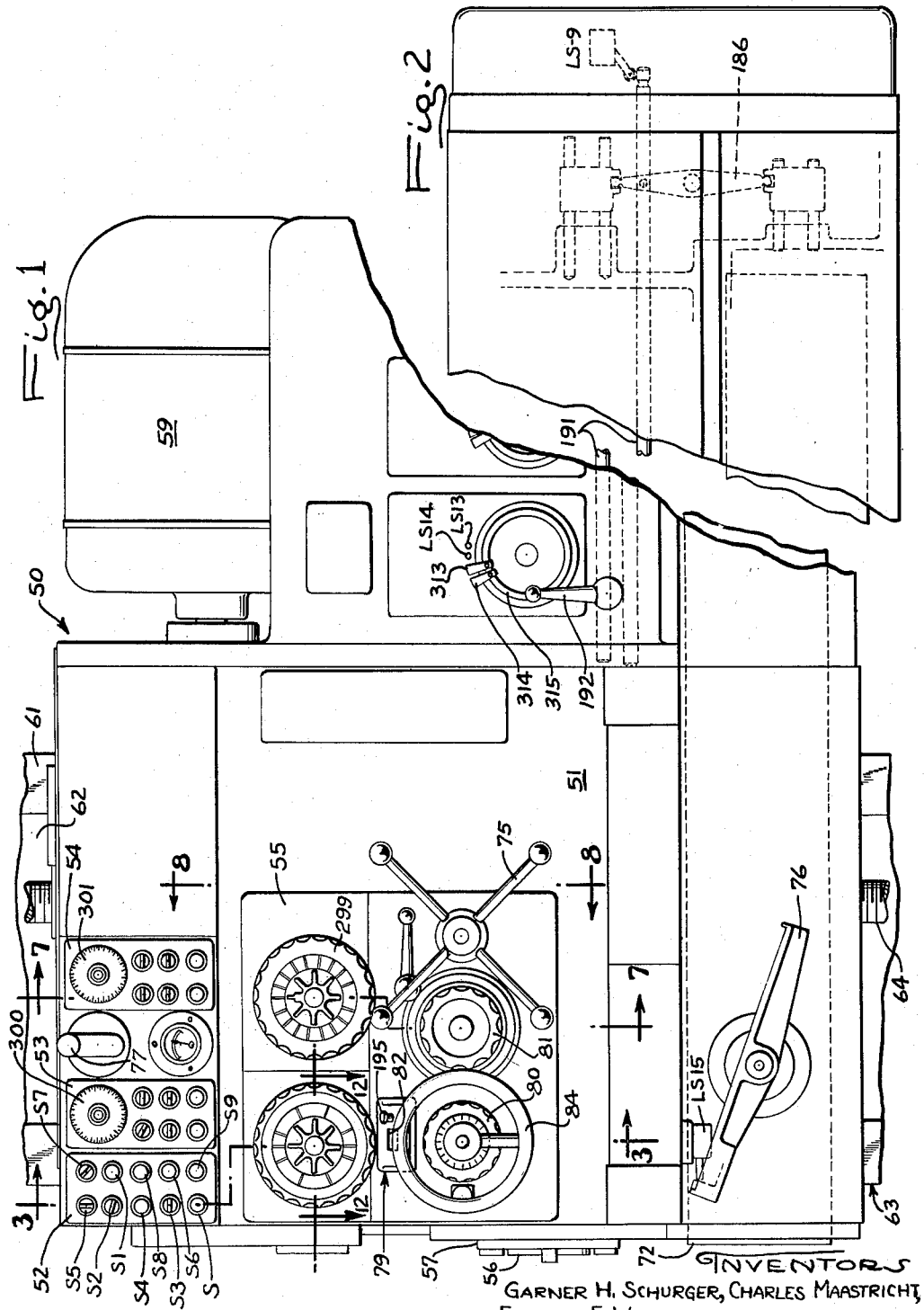

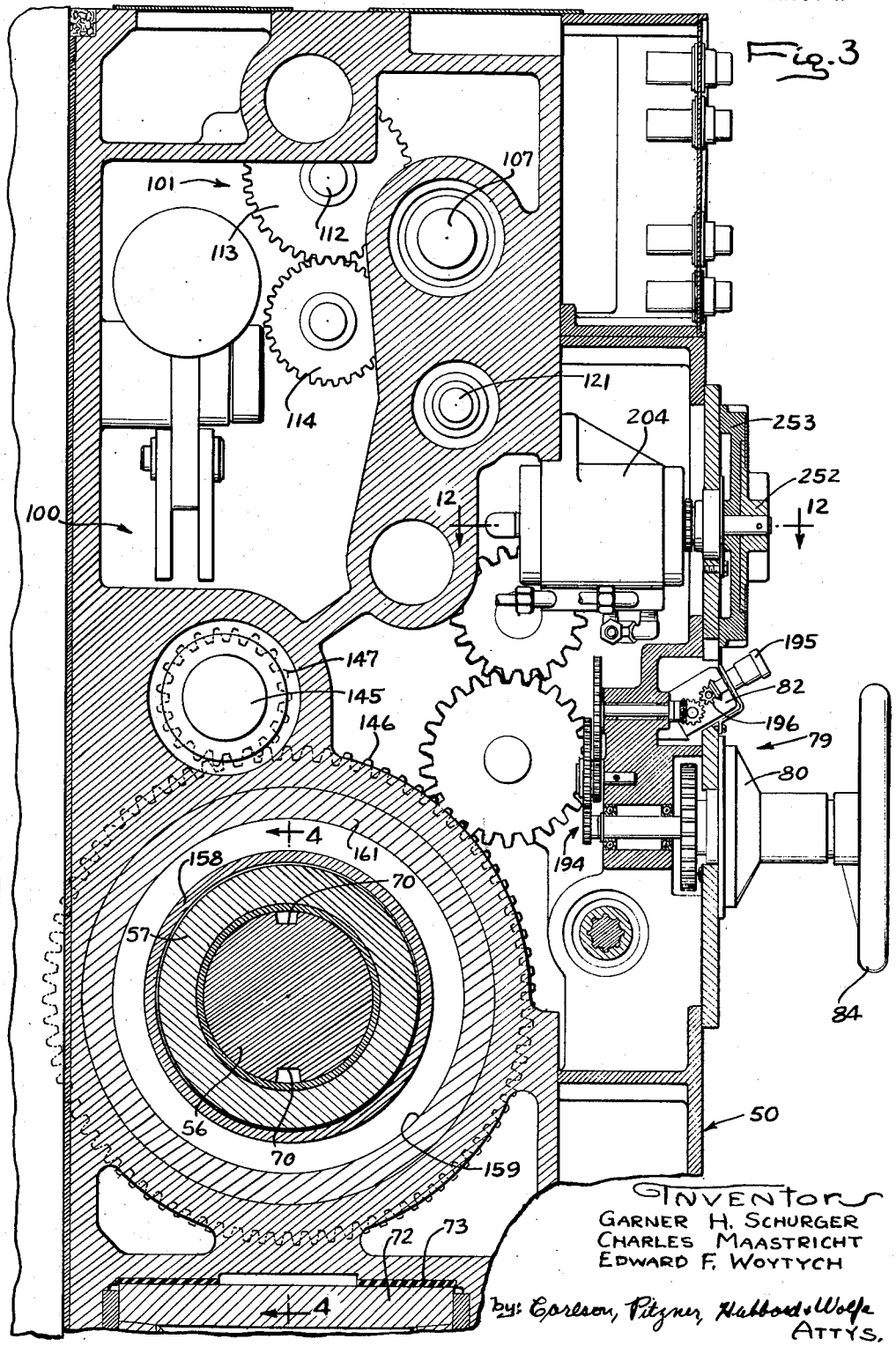

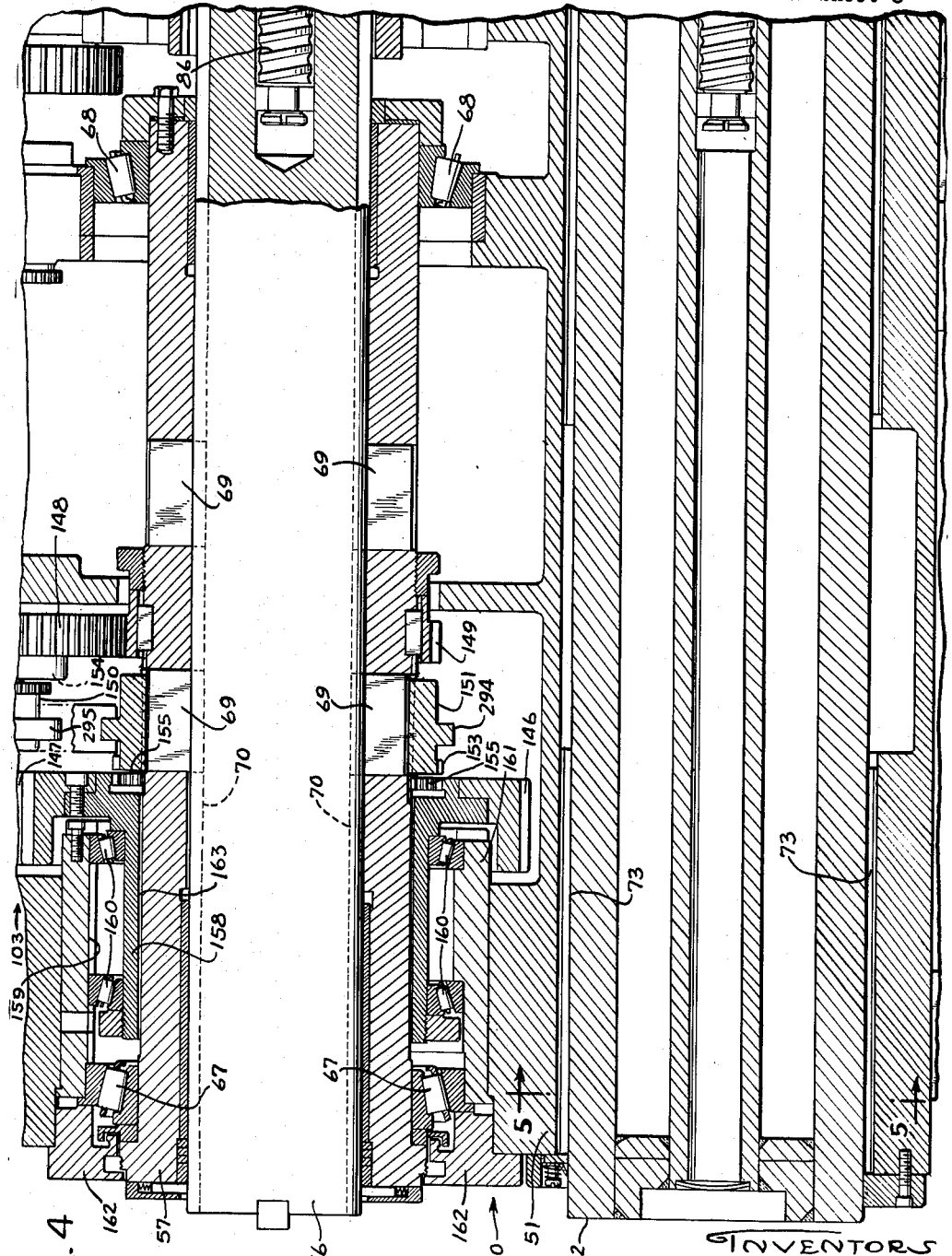

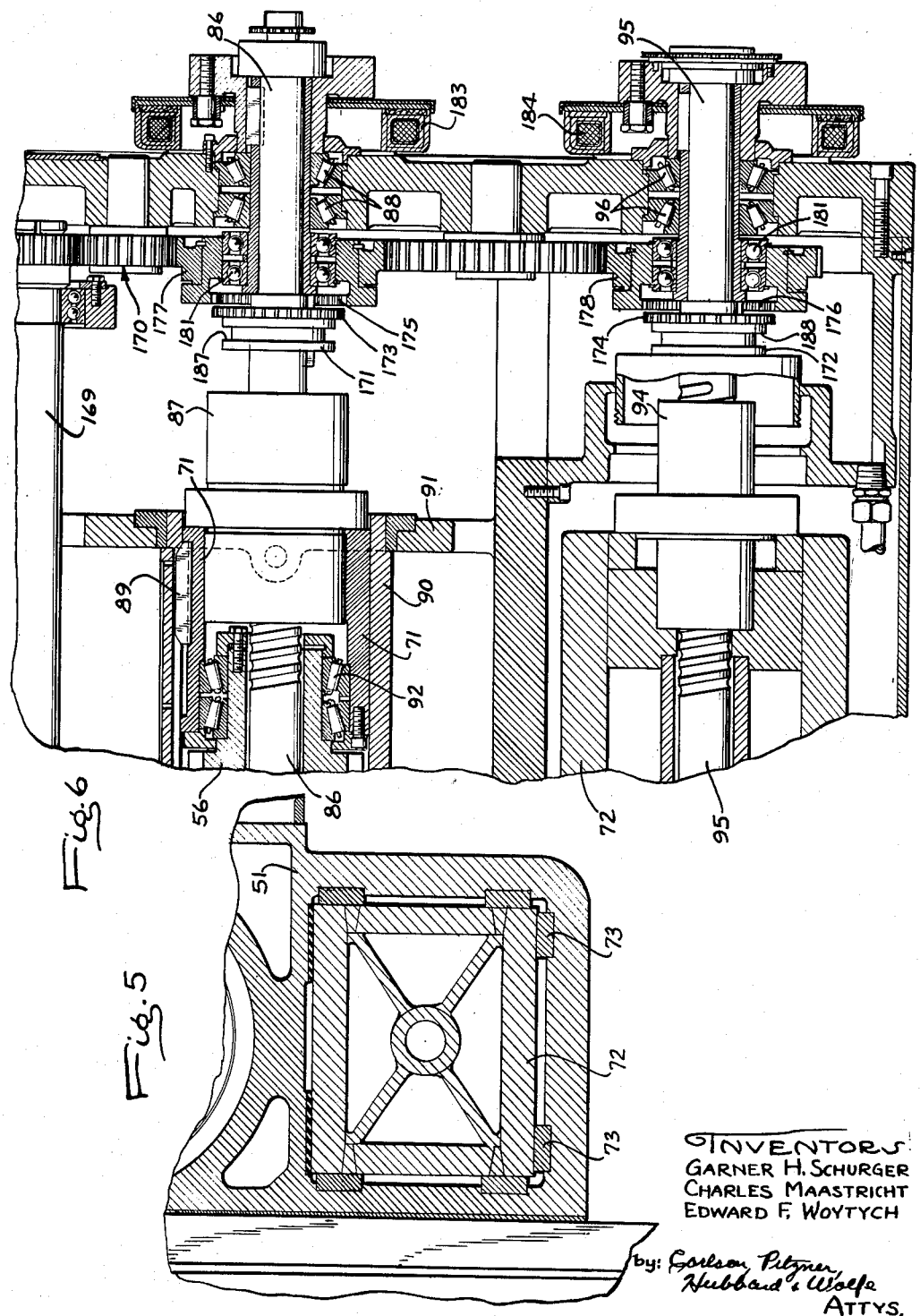

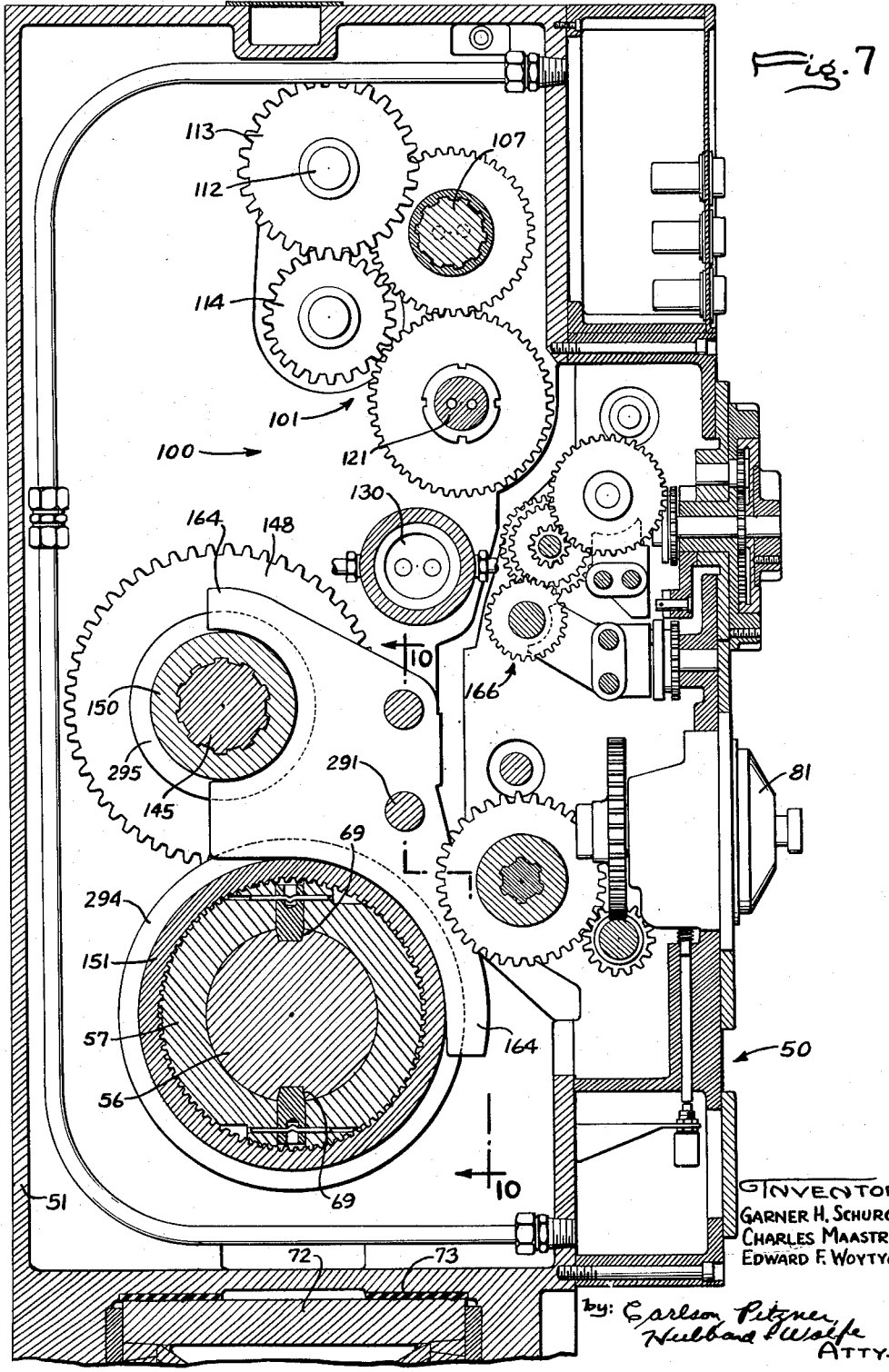

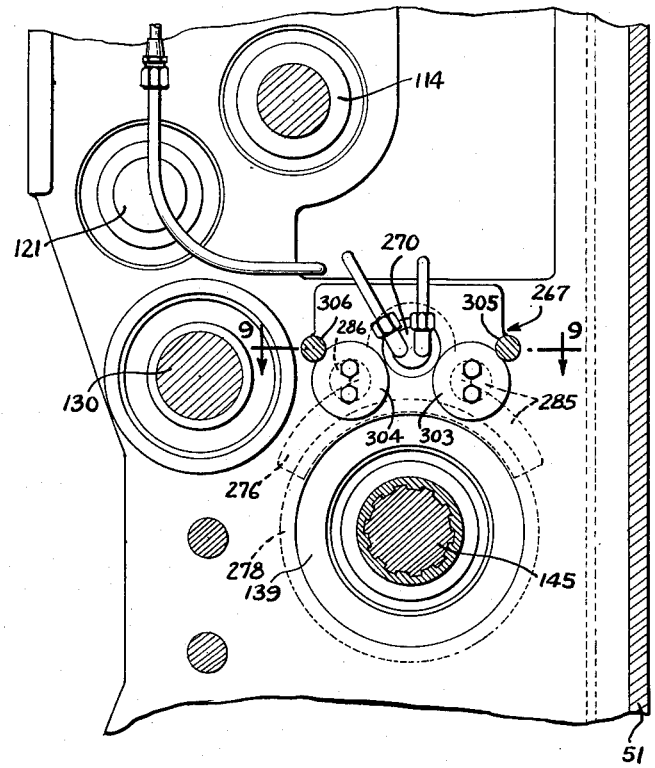
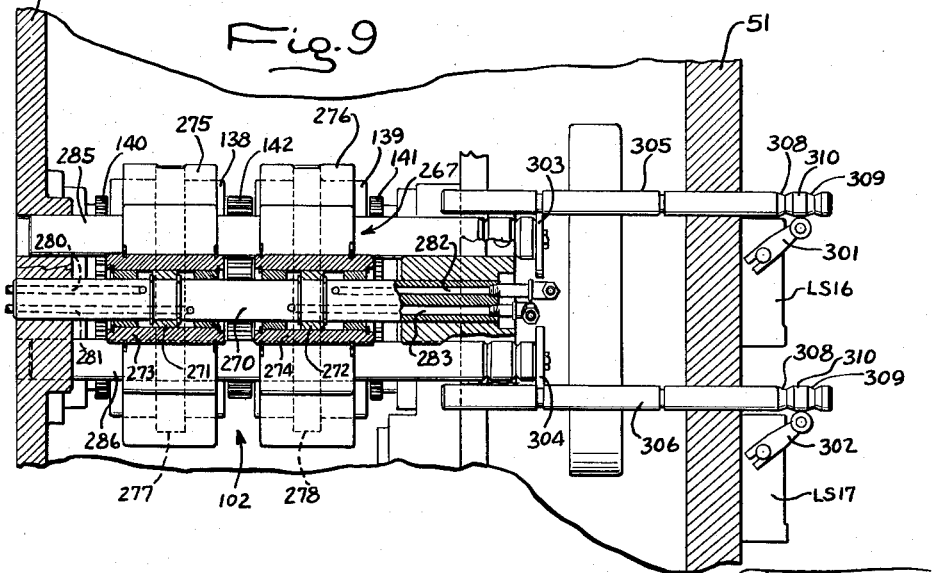

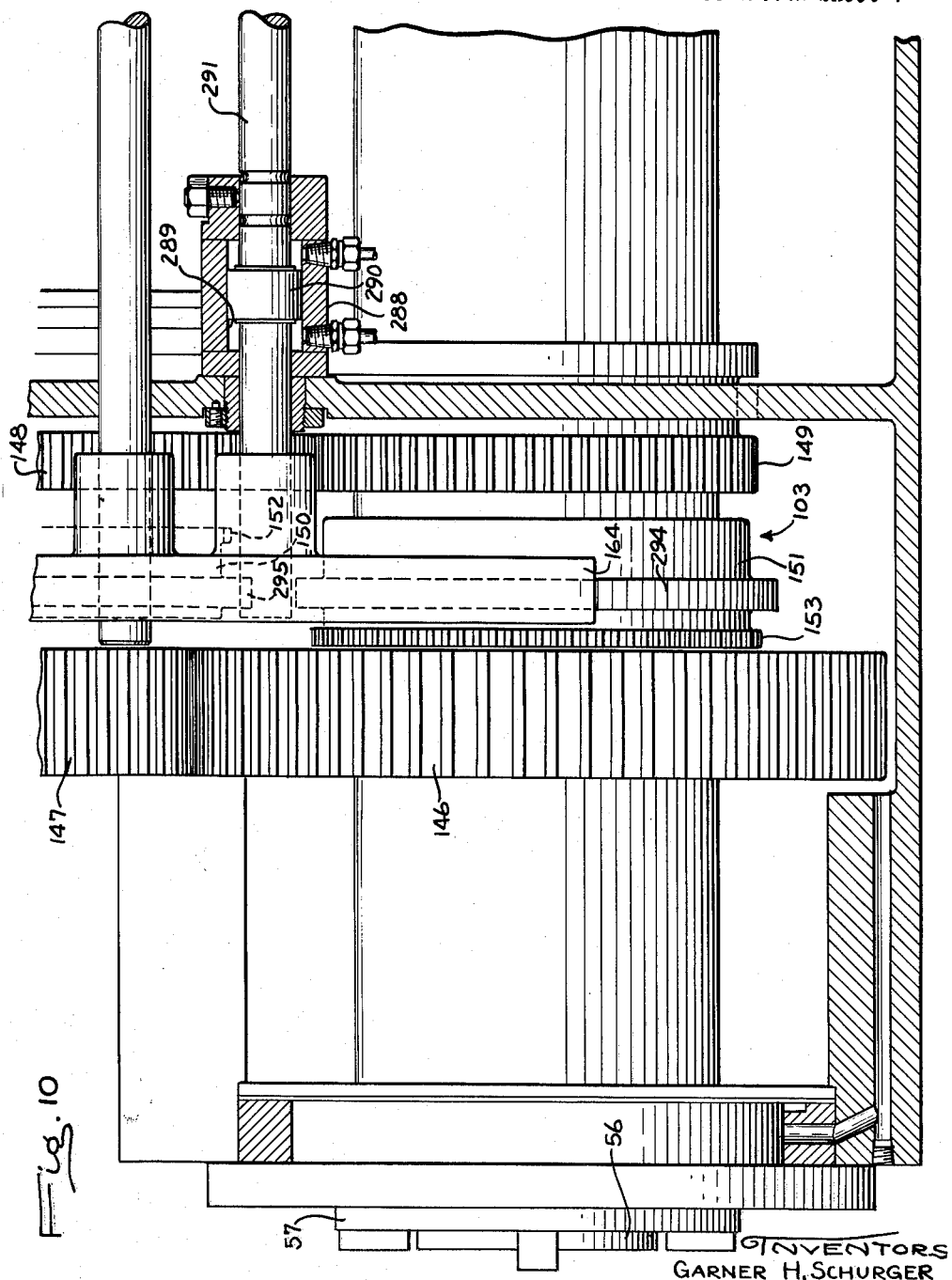

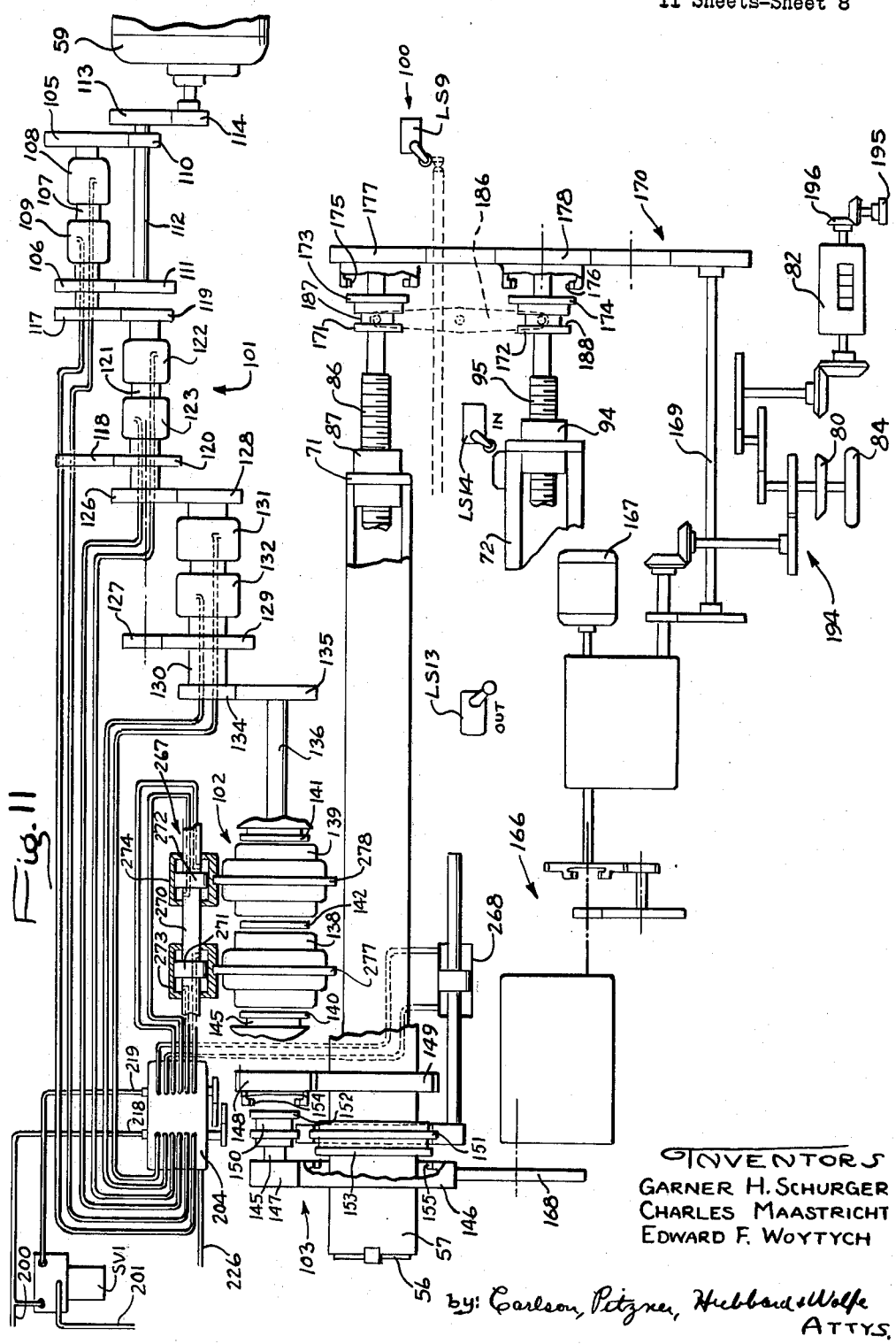

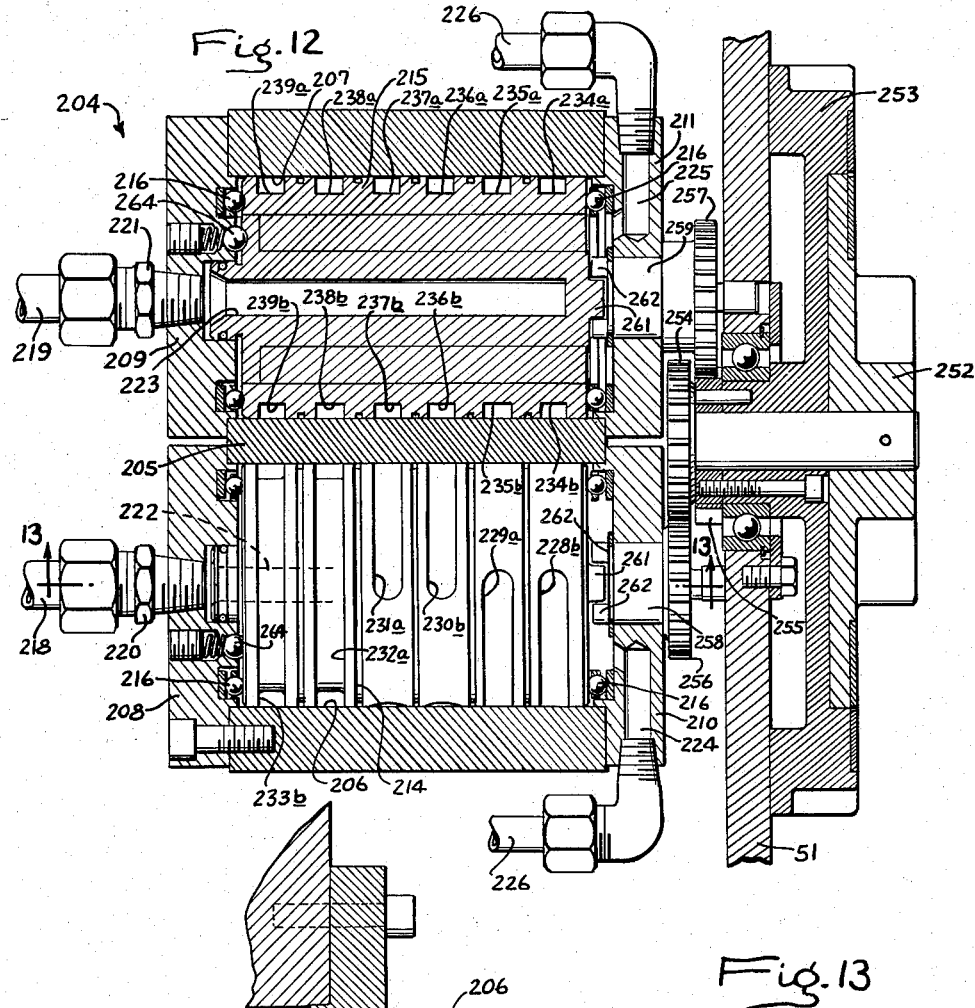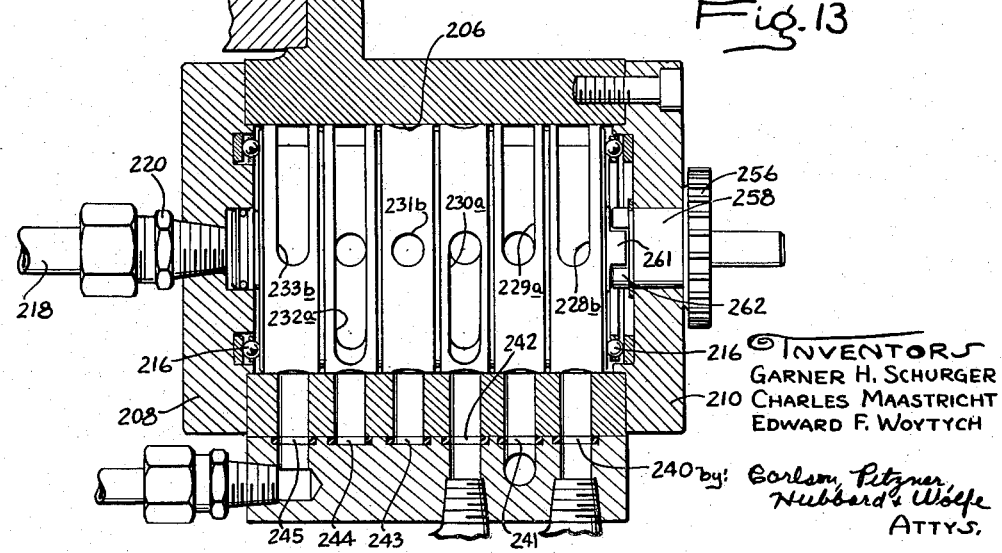

G. H. SCHURGER ET AL 2,984,159

MACHINE TOOL

Filed Sept. 5, 1956

INVENTORS
GARNER H. SCHURGER
CHARLES MAASTRICHT
EDWARD F. WOYTYCH by: Carlson, Pitzner, Hubbard & Woefe
ATTYS.

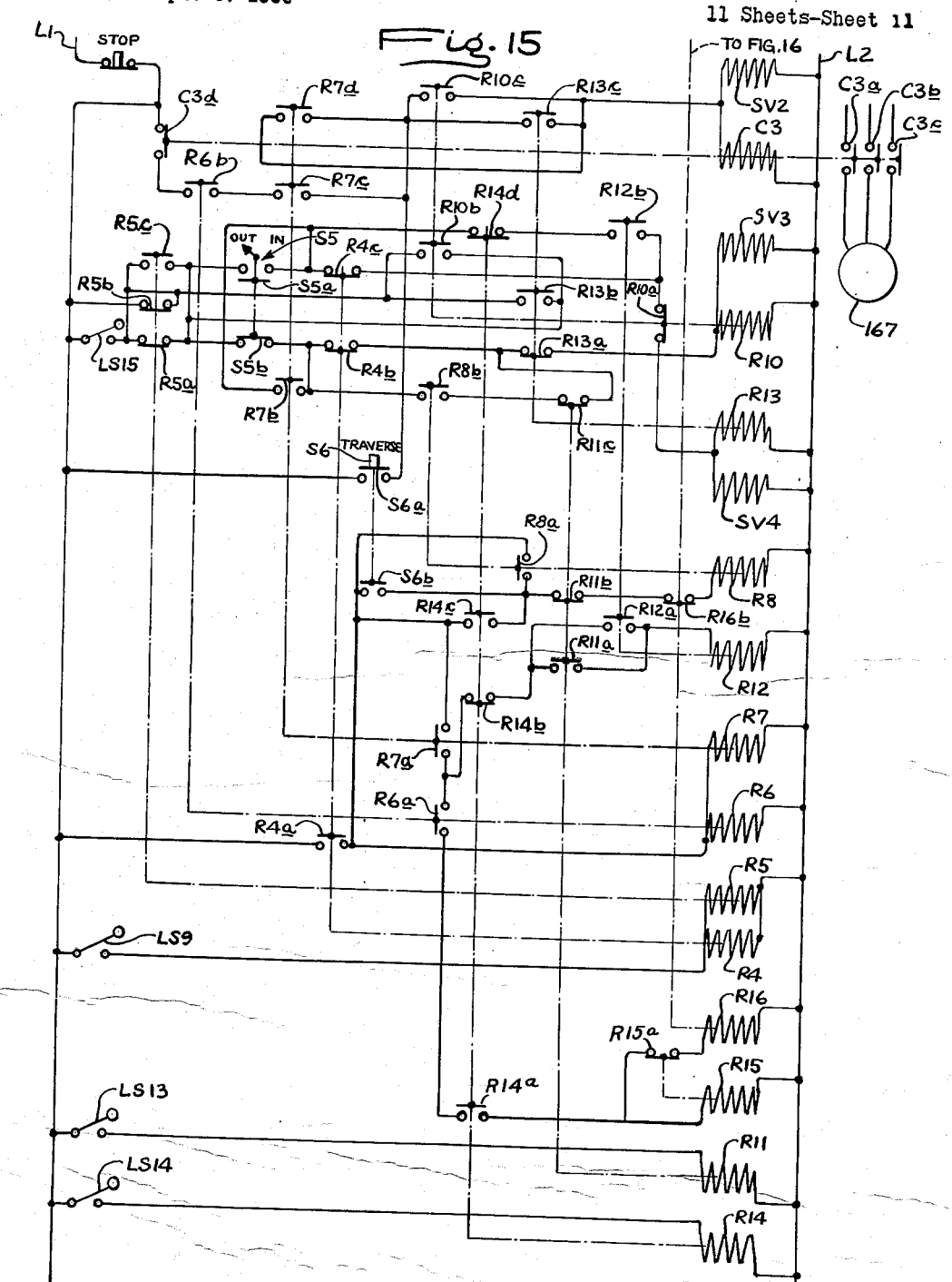

United States Patent Office 2,984,159
Patented May 16, 1961

2,984,159
MACHINE TOOL

Garner H. Schurger, Charles Maastricht and Edward F. Woytych, Fond du Lac, Wis., assignors to Giddings & Lewis Machine Tool Company, Fond du Lac, Wis., a corporation of Wisconsin Filed Sept. 5, 1956, Ser. No. 608,061
16 Claims. (Cl. 90—14)

The present invention relates to machine tools of the horizontal boring, milling and drilling type, and more particularly to an improved headstock for such a machine tool.

One object of the present invention is to provide an improved headstock of the type indicated which affords an enlarged flexibility of control when carrying out various machining operations, which control can be accomplished by simple finger-operated selectors and push-button switches on the headstock so that operator fatigue in operating a large machine tool is reduced to a minimum.

Another object of the present invention is to provide a headstock of the above type having an improved gear transmission mechanism which is adapted for both high speeds and for high thrusts while nevertheless keeping possible distortions of the cutting tool spindle to a minimum, thereby increasing the accuracy of the machining work possible.

A further object is to provide a headstock for a machine tool of the foregoing type which can be used for shaping operations.

Still another object of the present invention is to provide a headstock of the foregoing characteristics which is of structurally strong and rigid construction and which retains the simplicity and ease of operation desirable in such a machine tool.

Still a further object of the present invention is to provide a headstock of the above characteristics which has an improved transmission and gear shifting arrangement in which various speeds and feeds may be selected automatically and positively without necessitating manual operations in order to mesh the transmission gears.

Still another object of the present invention is to provide a headstock of the foregoing type having an improved accurate spindle depth measuring arrangement for indicating the extent of spindle translation.

Still a further object of the present invention is to provide a headstock of the above character having an improved hydraulic control system which is easily operated and which simplifies the operation and control of the machine.

Other objects and advantages will become apparent as the following description proceeds, taken in connection with the accompanying drawings wherein:

Figure 1 is a front view of a headstock illustrative of the present invention and showing its control panels.

Fig. 2 is a fragmentary front view of a portion of the headstock illustrated in Fig. 1 and showing the shifting mechanism for the spindle and underarm carried thereby.

Fig. 3 is a section view taken substantially in the plane of line 3—3 of Fig. 1 and showing a portion of the transmission enclosed within the headstock.

Fig. 4 is a section view taken substantially in the plane of line 4—4 of Fig. 3 and showing the spindle and underarm in more detail.

Fig. 5 is a section view taken substantially in the plane of line 5—5 of Fig. 4 and showing the underarm and its support.

Fig. 6 is a section view taken in substantially the same plane as Fig. 4 but showing the spindle and underarm rams at the rear of the headstock.

Fig. 7 is a section view taken substantially in the plane of line 7—7 of Fig. 1 and showing further the enclosed transmission.

Fig. 8 is a section view taken substantially in the plane of line 8—8 of Fig. 1 and showing an elevation view of the shifter mechanism for the planetary gear transmission.

Fig. 9 is a section view taken substantially in the plane of line 9—9 of Fig. 8, showing a plan view of the planetary transmission and its shifter mechanism.

Fig. 10 is a plan view of the spindle drive two-speed shifter mechanism and bullgear.

Fig. 11 is a schematic representation of the transmission and hydraulic control system contained in the headstock shown in Fig. 1.

Fig. 12 is a section view taken substantially in the plane of line 12—12 of Fig. 1 and showing a valve for the hydraulic system.

Fig. 13 is a section view taken substantially in the plane of line 13—13 of Fig. 12 and showing, in elevation, one of the control valve spools.

Fig. 15 is a wiring diagram showing that portion of the electrical control circuit employed when the headstock is used for shaping operations.

Figure 14:
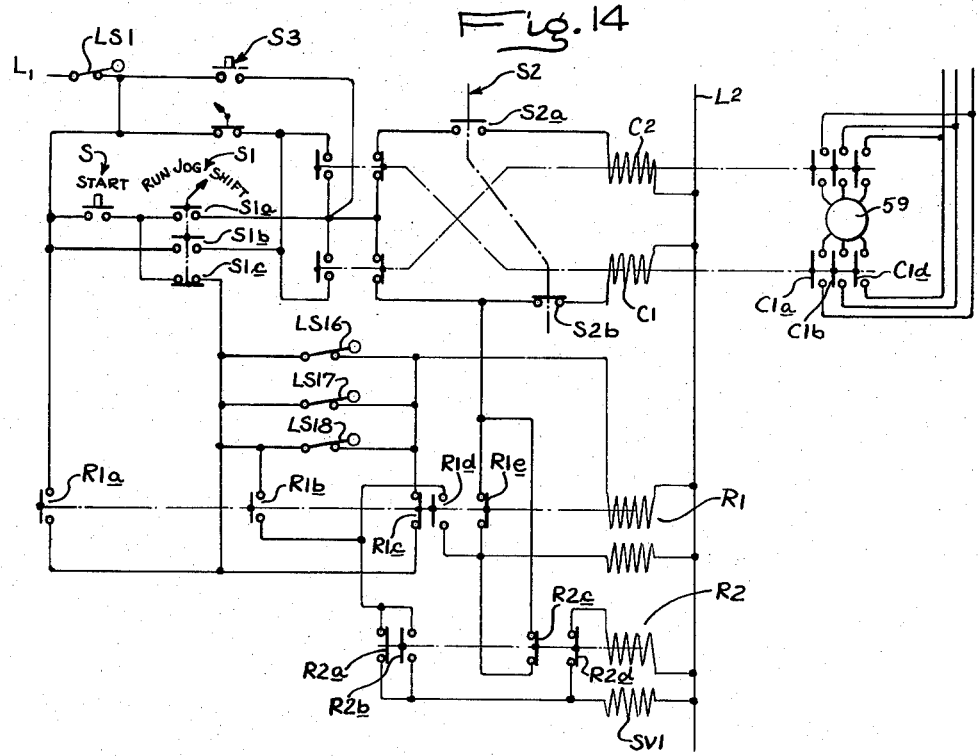
Fig. 14 is a wiring diagram showing that portion of the electrical control circuit for use in the hydraulic shifting of the transmission gears.

While a certain illustrative embodiment has been shown in the drawings and will be described below in considerable detail, there is no intention to limit the invention to the specific form disclosed but, on the contrary, the intention is to cover all modifications, alternatives, equivalents, and uses falling within the spirit and scope of the invention as expressed in the appended claims.

*In general*

Machines of the type upon which the headstock herein to be described is useful are commonly known to those skilled in the art as horizontal boring, milling and drilling machines. Briefly, these machines comprise a fixed bed mounted on a shop floor and having on its upper surface parallel ways carrying a column base or saddle. A vertical column is mounted on the upper surface of this base and supports by suitable vertical ways on one face a spindle headstock. To perform cutting operations on a workpiece, the workpiece is secured to a table or other support adjacent the headstock of the tool. The desired operations can then be performed on the workpiece by adjusting the position of the headstock, the column, and the cutting tool carried by the headstock.

Referring to Fig. 1 of the drawings, the headstock 50 herein to be described is shown comprising a housing 51 having on its front face various control panels 52, 53, 54, 55. To support a cutting tool, the headstock includes a rotatable and translatable spindle 56 splined within a sleeve 57 journaled in the headstock. Suitable drive motors, one of which is shown generally at 59, are included on the headstock. The headstock is mounted on ways 61 on a vertical face 62 of the column 63 and is moved relative thereto by a suitable elevating screw 64 driven by a power mechanism (not shown) in the column 63 and threaded in a nut in the headstock. If desired, a platform on which the operator may stand can be attached to the headstock so that the operator is close to the controls and can devote his full time to the operation of the machine. By moving the headstock vertically along the face of the column, by moving the column horizontally along the machine tool bed, and by reciprocating and rotating the spindle in the headstock, three cutting dimensions are possible with the illustrated machine tool, making it extremely versatile and adapted for performing a multitude of operations on various sizes and shapes of workpieces.

In addition to the spindle, the headstock includes the controls for operating the machine as well as the power mechanisms for translating and rotating the spindle. On the remainder of the machine there is included the necessary electrical circuits, lubricating systems, cooling systems, and the like generally found on machines of this type. Inasmuch as this invention is concerned only with the headstock and its associated transmission and controls, the remaining portions of the horizontal boring, drilling and milling machine have not been shown.

The headstock

Referring now to Figs. 1 through 4, the headstock there shown comprises an internally partitioned housing 51 having journaled thereon and extending out one end thereof the spindle sleeve 57. The spindle sleeve (Fig. 4) is journaled in suitable bearings 67, 68 at its front and rear ends respectively in the housing 51. The sleeve carries centrally the tool spindle 56 which is keyed, as at 69, to the sleeve for axial but not rotary movement, suitable grooves 70 being provided in the spindle, so that rotation of the sleeve by a suitable transmission imparts rotary movement to the spindle. At the innermost end of the sleeve is a ram 71 (Fig. 6) for axially translating the spindle 56 into and out of the sleeve 57. Mounted directly beneath the spindle sleeve is an underarm 72 slidably supported in suitable bearings 73 within the spindle housing for axial movement into and out of the same. The underarm is intended for the purpose of supporting the spindle at its greater extensions and also various accessories fastened to the spindle. For a more complete description of the underarm and its uses, reference is hereby made to application Serial No. 395,464, filed December 1, 1953, now Patent No. 2,890,629, issued June 16, 1959.

Above the spindle and within the housing is located a transmission for feeding the spindle out of the sleeve and for rotating the sleeve to rotate the spindle. In order that the headstock be useful for a large number of ma- at 69, to the sleeve form axial but not rotary movement, ous speeds and feeds. In the present transmission, to be described below, there is a possibility, for example, of thirty-two rotary spindle speeds and a much greater number of spindle feeds. Control of these speeds is accomplished through the control panels 52, 53, 54, 55 containing electrical switches and pushbuttons, on the front of the headstock 50. In a like manner, the feed of the spindle 56 into and out of the spindle sleeve and the feed of the underarm 72 into and out of the headstock housing 51 is controlled, as is the speed of the column and headstock feeds, through the panels.

Referring to Fig. 1, it can be seen that the housing also includes a pilot wheel 75 which is connected to the spindle feed transmission for manually feeding either the spindle or the underarm. Also on the headstock is a foot-operated clamp lever 76 for clamping the underarm to the housing when the underarm is being used to support an attachment such as an angular milling attachment. When the underarm is so used, feed of the cutting tool is obtained by moving either the headstock or the column.

For purposes of alining the spindle with the workpiece, suitable indicating devices are desirably provided. There is shown, for example, on the illustrative headstock, a telescope eyepiece 77 which is used to view a scale on the column for measuring vertical movement of the headstock on the column. A similar telescope not shown, is used for viewing a suitable scale on the base of the machine. Also provided is a depth indicator shown generally at 79 for purposes of indicating the amount of projection of the spindle out of the headstock towards the workpiece. The depth indicator includes a pair of dials 80, 81 calibrated with vernier scales and with a rotary counter 82 for determining larger distances. Associated with one of the indicating dials is a hand wheel 84 used when a fine adjustment of the spindle projection is desired.

The spindle 56 of the illustrative headstock 50 (Figs. 3 and 4) is mounted within a spindle sleeve 57. As described above, a pair of diametrically opposed slots 70 on the spindle 57 receive the keys 69 on the spindle sleeve for the purpose of splining the spindle to the sleeve. In this manner, rotary movement may be imparted to the spindle through the sleeve while allowing freedom of axial movement.

An axial thrust is imparted to the spindle by the ram 71 (Fig. 6). This is desirably accomplished by a screw 86 threaded in a ball bearing type nut 87 secured to the ram and journaled in bearings 88 in the headstock housing 51. The ram is keyed, as at 89, to a ram guide 90 secured to a partition 91 within the headstock housing 51 and is journaled to the inner end of the spindle by means of suitable thrust bearings 92. Upon rotation of the screw 86 in the ball bearing nut 87, the ram translates the spindle 56 axially of the spindle sleeve.

The underarm 72 is provided at its rearmost end with a ball bearing type nut 94 engaging a screw 95 rotatably mounted in bearing 96 in the headstock housing. Rotating the screw 95 by a suitable gear train axially translates the underarm 72 into and out of the headstock housing. In this instance, no underarm ram is required as the underarm is rectangular in cross section and does not rotate. The underarm itself is supported for axial translation by the bearing pads 73 secured to the internal walls of the headstock housing and serving as underarm guides.

Coolant and lubricant are circulated throughout the headstock housing which is sealed to prevent leakage. In this manner, the internally moving parts within the headstock are kept lubricated as well as cooled, a suitable lubrication system (not shown) being provided on the column and column base.

As one feature of the headstock illustrative of the present invention and as shown in detail in Fig. 5, the underarm 72 is supported in an integral casting forming a part of the headstock housing 51. In prior practice the underarm housing was formed as a separate unit and bolted to the headstock housing underneath the spindle and sleeve assembly. It has been discovered that by forming this underarm supporting housing as an integral casting with the headstock housing, rigidity and usefulness of the underarm has been increased many-fold.

The headstock transmisson

In the successful performance of diverse machining operations with the horizontal boring, milling and drilling machine headstock of the present invention, the sleeve 57 carrying the spindle 56 must be susceptible of rotation at a great number of different speeds determined according to the workpiece and the particular operation being performed on it. The headstock is therefore provided with a multi-speed transmission, indicated generally as 100, organized so that spindle sleeve 57 is driven by the motor 59 in a selected one of a great number of speeds (in the present case thirty-two), such speeds being grouped as a plurality of high speeds and a greater plurality of low speeds. For this purpose there is provided in the headstock transmission 100, an eight-speed transmission 101 and a three-speed planetary speed reduction transmission 102, and a two-speed high-low back gear transmission 103. Provision is made for interconnecting the three transmissions 101, 102, 103 in tandem relation between the motor 59 and the spindle sleeve 57. Referring in particular to Fig. 11, there is shown the eight-speed transmission (indicated generally at 101) and the three-speed planetary transmission (indicated generally at 102), giving a total of twenty-four speeds, eight of which, however, are duplicates of the others.

Briefly, the eight-speed transmission 101 comprises a pair of gears 105, 106 rotatably mounted on a lay shaft 107 and adapted to be selectively fixed thereto by means of hydraulically actuated disc clutches 108, 109. Each of gears 105, 106 continuously meshes with corresponding gears 110, 111 on a shaft 112 drivingly connected through spur gears 113, 114 to the spindle sleeve motor 59. The shaft 107 has fixed thereto a pair of spaced gears 117, 118 which engage gears 119, 120 rotatably mounted on a second layshaft 121. A second pair of hydraulically actuated disc clutches 122, 123 is provided for selectively securing gears 119, 120 to shaft 121, thus providing a series of four speeds. The second layshaft 121 is in turn provided with a pair of output gears 126, 127 similarly meshing with a pair of gears 128, 129 rotatably mounted on a third shaft 130 and adapted to be selectively fixed thereto by a third set of hydraulically actuated disc clutches 131, 132. On this third shaft is an output gear 134 meshing with an input gear 135 on the input shaft 136 of the planetary transmission 102.

The planetary transmission is directly of the type disclosed and claimed in copending application of John C. Hollis, Serial No. 397,410, filed December 10, 1953, now Patent No. 2,848,980, issued August 26, 1958, to which reference is made for further detailed description. Suffice it here to say that there are two planetary gear trains in tandem, each being controlled by the movement of a ring gear, 138 and 139 (Fig. 9) respectively. Each ring gear is alternatively engageable with a respective stationary clutch gear 140, 141 fixed on the headstock housing or with a clutch gear 142 fixed to the planet carrier of the first planetary gear train. The input shaft 136 has fixed thereto the sungear of the first planetary gear train while the planet carrier of the second planetary gear train is fixed to an output shaft 145 (Fig. 3). The gears in the foregoing transmissions 101, 102 are dimensioned such that the output shaft is capable of rotating at twenty-four different speeds.

When the spindle sleeve is to be rotated by the transmission 100 at low speeds and high torque, a considerable radial thrust exists between the force transmitting gears. In order to prevent this force from being exerted on the spindle sleeve 57 with the consequent misalinement of the sleeve and the spindle 56 with respect to the headstock 50, an improved bullgear 146 constructed in accordance with the present invention is employed. By preventing the transmission of radial thrusts to the spindle sleeve, undesirable deviations in spindle alinement are avoided with the desirable result of substantial improvement in the accuracy of the machine tool.

So as to engage the bullgear 146, the output shaft 145 from the planetary transmission 102 has fixed thereto a pinion drive gear 147 of relatively great axial length to accommodate the high torque involved and adapted to mesh with the bullgear 146 surrounding the spindle sleeve 57. Rotatably mounted on the planetary transmission output shaft 145 is a second high-speed output gear 148 meshing with a gear 149 (Fig. 7) integral with the spindle sleeve and spaced thereon apart from the bullgear. Intermediate the gears 147, 148 on the planetary output shaft 145 and the gears 146, 149 on the spindle sleeve 57 are a pair of clutches 150, 151 splined to the output shaft 145 and to the spindle sleeve 57 respectively. The clutches 150, 151 are formed with external clutch teeth, 152, 153 respectively, engageable with internal clutch teeth 154, 155 on the corresponding high speed gear 148 and bullgear 146. The clutches 150, 151 are coupled together so that they are alternatively and not simultaneously engageable with their respective gears. Thus, when the spindle sleeve clutch 151 engages the bullgear 146, power is transmitted from the output shaft 145 through the gear 147 fixed thereto, to the bullgear 146, and thence through the clutch 151 to the spindle sleeve 57. On the other hand, if the clutch 150 on the planetary output shaft 145 engages with the spurgear 148 rotatably mounted on that shaft, power is transmitted from the planetary transmission 102 through the clutch 150 splined on the transmission shaft 145 to the spurgear 148, thence to the spurgear 149 fixed to the spindle sleeve 57.

As the headstock is presently designed, the latter gear train is considered the high-speed gear train, while the former or bullgear train, is employed for transmitting high torque at low speeds. The two-speed transmission 103 just described (high-speed, low torque and low-speed, high torque transmission) when joined in tandem with the twenty-four speed transmission portion previously described, affords a total of forty-eight output speeds. A number of these speeds are duplicates, however, because of the particular gear design and as a result, the present transmission 100 has a total of thirty-two different spindle sleeve speeds.

For the purpose of transmitting rotary torque only to the spindle sleeve 57 and thereby eliminating radial forces tending to force the spindle out of alinement, the bullgear 146 is mounted in the headstock housing 51 in an improved and novel manner. In accordance with the present invention, the bullgear 146 is formed with an axially extending sleeve portion 158 (Fig. 4) having an internal diameter slightly greater than the external diameter of the spindle sleeve 57 around which it is located. The bullgear sleeve 158 is journaled within a cylindrical opening 159 in the headstock housing 51 by means of suitable bearings 160 around its outer periphery. In this manner, any radial forces or thrusts on the bullgear 146 are transmitted through the bearings 160 directly to the headstock housing 51. To increase the rigidity of the bullgear mounting, the cylindrical opening 159 is formed by a sleeve 161 rigidly pressfitted into the headstock housing 51 from the spindle opening end thereof and a collar 162 is placed in front of the sleeve 161 and secured to the headstock housing 51.

Transmission of radial forces to the spindle sleeve is effectively prevented by journaling the spindle sleeve in its own bearings 67 within the headstock housing, and by locating the bullgear bearing 160 axially inward of the spindle sleeve bearings 67. Additionally, the slight clearance 163 between the bullgear 146 and the spindle sleeve 57 allows for a slight deformation of the bullgear 146 without its binding on the spindle sleeve 57 and provides an air space which serves to insulate against the transmission of heat from the bullgear and transmission 100 to the spindle sleeve and the spindle. Distortion of the spindle sleeve or spindle is thereby prevented with the desirable result that the spindle runs true in the headstock and the accuracy of the machine tool is substantially improved.

Simultaneous engagement of both clutches 150 and 151 to their respective gears is prevented by employing a single shifter fork 164 (Fig. 10) for shifting both of the clutches 150, 151 on the planetary output shaft 145 and the spindle sleeve 57 respectively. Thus, shifting of one clutch to its engaged position simultaneously disengages the other clutch so that only one set of gears, either the high-speed low torque gears 148—149, or the low-speed high torque gears 146—147 is engaged at one time.

Axial translation or feed of the spindle 56 and the underarm 72 is controlled through a feed transmission indicated generally at 166 (Fig. 11). In order to provide either a traverse speed or a lower cutting speed of the spindle or underarm, this transmission is driven by either a rapid traverse motor 167 or by a rapid traverse gear train 168 leading from the bullgear 146 on the spindle sleeve 57, respectively, thus affording a large number of possible feed rates from which to select. The feed transmission 166 is connected through an output shaft 169 and a suitable gear train 170 alternatively to the spindle ram 71 or to the underarm 72 through their respective feed screws 86 and 95.

For selectively engaging the feed screws 86 and 95, each carries a gear clutch 171, 172 respectively splined thereon for axial movement. Each clutch has external gear teeth 173, 174 respectively engageable with corresponding internal gear teeth 175, 176 on output gears 177, 178 meshing with the gear train 170. Each input gear is journaled on the feed screws 86, 95 respectively by suitable bearings 181. For instantaneously halting rotation of the feed screws 86, 95, an electric brake 183, 184 is provided on each of the feed screws 86, 95.

In order to prevent both the underarm and spindle feeds from being engaged at the same time, a rocking yoke assembly 186 pivoted intermediate its ends to the headstock engages annular grooves 187, 188 on the feed clutches 171, 172 (Figs. 2 and 11). For shifting the rocking yoke 186, a rod 191 is pivoted thereto and is axially movable in the headstock by a handle 192 on the control panel (Fig. 2). When an appliance or auxiliary device is to be used and fastened to the underarm and the spindle, and the spindle feed clutch 171 is engaged, the spindle pulls the underarm out without necessitating the use of a positive drive for the latter. The ball bearing nut and screw feed being relatively frictionless, permit the underarm or the spindle to be moved even though the respective screw is not positively driven.

As an added feature of the present invention it has been discovered that by using the ball bearing nut and screw feed mechanism, the axial position of the spindle or the underarm can be accurately determined by measuring the amount of rotation of the feed screws 86, 95. To this end, the indicating mechanism or depth indicator 79 is connected directly to the feed transmission 166 through an indicator transmission or gear train, shown generally as 194. A reset knob 195 and gear 196 is included in the indicator transmission so that the counter may be set independently of the position of the spindle.

*Hydraulic system*

To facilitate control from a remote point on the headstock 50 of various ones of the clutches included in the transmission 100, as well as various other components of the machine tool and headstock such as clamps, the lubricating system and the like, hydraulic actuators are provided which are operated under the control of a multi-way control valve and other suitable valves actuated by electric solenoids. In each instance, the clutches referred to in connection with the hydraulic system are of the multi-disc friction type so as to make possible the use of hydraulic actuators with their concomitant advantages of rapid and positive actuation.

Included in the hydraulic system are the series of clutches 108, 109, 122, 123, 131 and 132 for operating the eight-speed transmission 101; various other speed, feed and clamp clutches (not shown); and the hydraulic shifters for the planetary transmission 102 and the two-speed transmission 103.

Referring to Fig. 11, hydraulic pressure fluid is supplied to the system through a conduit 200 leading from a suitable pump (not shown) driven by an electric motor (not shown). Similarly, drain fluid from the system is exhausted through a drain conduit 201 to the reservoir (not shown) which supplies the pump, suitable relief valves, filters and the like being provided for protection of the hydraulic system.

To control the application of pressure fluid to the various clutches and actuators forming a part of the spindle speed transmission 100, a control valve 204 (Figs. 12 and 13) is provided which comprises a housing 205 having a pair of parallel cylindrical chambers 206, 207 therein, each of which is enclosed by suitable end plates 208, 209, 210, 211. Disposed within each of the chambers 206, 207 is a cylindrical valve spool, indicated generally as 214, 215 respectively. The spools are supported between the end plates by thrust bearings 216. Pressure fluid supply conduits 218, 219, connecting with the supply conduit 200, extend through an inlet fitting 220, 221 in one end plate 208, 209 of each chamber and axially through a bore 222, 223 in each valve spool 214, 215. In the opposite end plates 210, 211 are drain passages 224, 225 connected to a drain conduit 226 for directing pressure fluid back to the pump reservoir.

Each valve spool 214, 215 is provided with a plurality of peripherally disposed pressure fluid passages or grooves 228–233 and 234–239 respectively. On each of the valve spools shown in Figs. 12 and 13 there is a pair of grooves of different length on each grooved circumference. For convenience these grooves are distinguished, where shown, by the suffixes "a" and "b." The "a" grooves communicate with the pressure fluid supply bores 222, 223 and the "b" grooves communicate with the pressure fluid discharge passages 224, 225. The valve 204, being of the multi-way type, is provided with a plurality of outlets on the housing 205 corresponding to the fluid passages or grooves 218–229 on the valve spools 214, 215. Conduits lead from these outlets (of which outlets 240–245 for valve spool 214 are shown) to the various clutches and actuators of the transmission. By rotating each valve spool, different combinations of connections between the pressure inlet conduit and one of the outlet conduits is attainable. In this manner, pressure fluid may be directed to or exhausted from a selected clutch or actuator. The grooves in the periphery of the valve spool are timed with respect to each other so that when pressure fluid is directed, for example, to one side of an actuator, pressure fluid on the opposite side is exhausted through the valve spool to the drain.

The valve spools 214, 215, being side-by-side in the housing 205, are conveniently rotated individually by finger dials 252, 253 which are mounted concentrically of each other (Fig. 12). To rotate the valve spools, each dial has on its inner end a spurgear 254, 255 respectively meshing with spurgears 256, 257 mounted on shafts 258, 259 positioned axially of each valve spool 214, 215 respectively. Thus, rotation of the inner dial 252 rotates the gears 254 and 256, thereby rotating the corresponding valve spool 214 to set the control valve for the actuation of a predetermined combination of clutches in the transmission 100.

The fit between the spools 214, 215 and their respective chambers 206, 207, is normally machined to very close tolerances in order to reduce leakage to a minimum and for maintaining pressure within the valve 204. For example, the selector valve 204 shown in Figs. 12 and 13, is made with a 0.0002" clearance for the most satisfactory operation. For the purposes of preventing the valve spools from binding in their chambers due to lateral forces exerted on them by the gears, it is desirable to provide a floating drive coupling between the spools 214, 215 and their associated drive gears and dials. This is accomplished, in accordance with one feature of the present invention, by providing a keyed engagement between each of the valve spools 214, 215 and its associated drive shaft 258, 259. This is accomplished by a key or squared projection 261 on the end of each valve spool meshing with spaced keys 262 on the inner end of each drive shaft. When the dials 252, 253 are turned, rotational forces only are transmitted to the valve spools and the binding of the spools in the chambers due to radial forces is prevented by the keyed joints. By the use of the thrust bearings 216, hydraulic pressure cannot force the valve spools tightly against the end plates and cause them to bind in the housing. Thus, the spools in effect float in the valve chambers so as to be freely rotatable therein. A ball detent 264 is provided in end plates 208 and 209 to engage in depressions in each valve spool 214, 215 for holding the spools in their selected positions.

Provision is made for hydraulically shifting the gears in the planetary transmission 102 and the two-speed transmission 103. This is accomplished by hydraulic actuators 267, 268 which are of the piston and cylinder type and comprise a piston relatively movable within a cylindrical chamber formed in a cylinder housing. The actuators 267, 268 are operatively connected to suitable shifter yokes engaged with the various shiftable elements of the transmissions 101 and 102.

Referring to Figs. 8 and 9, the actuator 267 for the planetary transmission 102 comprises a rod 270 fixed within the headstock housing 51 and having formed thereon a pair of spaced piston members 271, 272. Surrounding each piston member is a slidable cylinder 273, 274 fixed to a shifter or fork 275, 276 engageable with a collar 277, 278 on the respective reaction ring 138, 139 of the planetary transmission 102. Pressure fluid is admitted to the cylinder between the piston and the cylinder walls through suitable conduits 280, 281, 282, 283 in the piston rod. Each of the conduits in the rod is connected to one of the outlet conduits from the control valve 204. By a given setting of the control valve, various combinations of movement of the reaction rings on the transmission can be accomplished for the purpose of providing speed variations from that transmission. The shiftable forks are guided in the headstock housing by suitable rods 285, 286 slidably mounted therein. One fork 275 is fixed to rod 285 which is slidably mounted in the other reaction ring fork 276. Similarly, the second reaction ring fork 276 is fixed to the second rod 286 which is slidably mounted in the first reaction ring fork 275. The reaction rings thus can be moved coaxially and independently of one another to effect the desired transmission setting.

The two-speed transmission 103 (Fig. 10) is also operated by a piston and cylinder motor 268. This actuator comprises a fixed cylinder having a piston 290 slidable therein. The piston is fixed to a rod 291 slidably mounted in the headstock housing and carrying the clutch shifter fork 164 described above. The fork 164 engages a collar 294 on the clutch 151 for engaging the bullgear 146 and a collar 295 on the clutch 150 for engaging the high-speed gear 148 rotatable on the output shaft 145 of the planetary transmission 102. Accordingly, the high-speed gear 148 and the bullgear 146 cannot be engaged together but must be selectively engaged according to the setting of the control valve 204 and the position of the hydraulic actuator 268.

Clutches and control valves similar to the ones just described are provided for the feed transmissions although they are not shown here. In most instances, these hydraulic control circuits include electrically operated solenoid valves. As shown in Fig. 11, for example, the supply of pressure fluid to that portion of the control valve 204 serving the planetary and two-speed transmissions 102, 103 includes solenoid valve SV1. One purpose of solenoid valve SV1 is to afford an intermittent supply of pressure fluid to the gear shifting actuators of these transmissions in order to facilitate the shifting of these gears, as will be more fully described in the next section. Additionally, the presence of solenoid valve SV1 prevents the gears from shifting while the spindle is rotating if the control valve 204 should be accidentally or unintentionally set to a new speed position.

*Electric circuits*

The hydraulic circuit solenoid valves, the electric driving motors, and the various switch relays and the like used in the control of the machine tool described above are operated from the control panels 52, 53, 54 fixed to the headstock 50 (Fig. 1). The switches carried on these panels are, for obvious reasons, grouped according to the machine element which they control. In the present instance three main groups are provided for: the spindle and underarm (52); the column (53); and the headstock (54).

The "spindle" and "underarm" group of switches includes: a start switch S; a three-position, run-jog-shift switch S1 which serves respectively to operate the spindle running circuit, the spindle jogging circuit, or the spindle transmission clutch gear shifting circuit; a two-position, spindle rotation direction control switch S2; a two-position control station switch S3 for operating the spindle either from the main control panels on the headstock or from a portable control panel at a remote point on the machine; a three-position, off-semiautomatic-automatic shaping cycle switch S4 for selecting the type of operation desired when using the underarm as a shaper; a three-position out-neutral-in spindle feed direction selector switch S5; a normally open traverse switch S6 serving, when depressed, to initiate traverse of the spindle or underarm; a two-position, off-on spindle clamp switch S7; a two-position off-on underarm clamp switch S8; and a normally closed emergency stop pushbutton switch S9 serving, when open, to stop the entire machine.

The feed transmission 166 is designed to provide a large number of cutting feed rates along with a traverse rate. One purpose of latter rate is for rapidly translating the spindle or the underarm to the vicinity of the cutting position, at which point traverse rate is stopped and the feed rate is initiated. When the spindle drive is started, by pushing the start switch S, which in turn energizes the spindle drive motor 59 to rotate the spindle, the feed transmission is simultaneously energized to drive the spindle or the underarm at a selected feed rate as determined by an appropriate feed rate selector dial on the control panel 299. When the traverse button S6 is pushed, a solenoid valve SV2 is energized which declutches the feed rate portion of the transmission 166 (by any suitable clutch mechanism, not shown) and the traverse motor 167 is energized to translate the spindle at the rapid traverse rate. When the traverse switch button is released the spindle feed resumes at its previous rate.

The feed transmission includes feed clutches which are hydraulically actuated under the control of electric solenoid valves SV3 and SV4. When valve SV3 is energized, for example, pressure fluid is applied to engage a feed clutch for moving the spindle outwardly; on the other hand, valve SV4 controls the application of pressure to a second clutch which, when engaged, moves the spindle inwardly. These clutches can be of any appropriate type which are disengaged when the accompanying solenoid valve is deenergized.

Inner and outer limits of travel of the spindle are provided by suitable limit switches (not shown) which serve to declutch the feed transmission by deenergizing electric solenoid valve SV3 or SV4. A further control including a limit switch (not shown) is provided for stopping spindle motion short of its inner or outer limit. In any case, it is possible to run the spindle in the opposite direction off of the limit switch with or without reversing its direction of rotation. The underarm will also be operated by the inner and outer limits as determined by appropriate limit switches (not shown). The outer limit of the underarm may be determined by the same outer limit switch of the spindle. The inner limit switch of the spindle being held inoperative to permit the spindle to remain fully retracted when the underarm alone is used.

The column and headstock groups of switches include the usual start, stop and direction switches, as well as speed potentiometers 300, 301.

The portable control station (not shown) is a substantial duplicate of the spindle control panel with the exception of the gear shifting provisions and the shaping cycle switches. The purpose of this portable control station is to enable the operator to dismount from his platform adjacent the headstock to have closer view of the work. The portable panel may either be connected to the main headstock through a headstock cable or may rest on a stand adjacent the worktable. This duplicate system of control is simply paralleled with the main system and operates in an identical manner.

A number of electro-magnetically controlled relays and contacts are included in the control circuits (Figs. 14 to 16) and are designated as R1, R2, R3, etc. In each case the respective contacts of these devices are designated by appending the additional designation a, b, c, etc. Thus, the contacts of relay R1 are designated R1a, R1b, etc.

The complete electrical circuit for controlling the operation of the spindle and underarm feeds, as well as the column and headstock traversing movements, has not been shown as the present invention is not concerned with this circuit in its entirety. Two portions of this electrical circuit, however, contains features which are of interest here. One of these features is involved in that portion of the circuit employed for shifting the clutch gears of the planetary and the two-speed transmissions 102, 103. This feature provides for alternately cycling the application of hydraulic pressure to shift the clutch gears and the drive motor to rotate the gears in the transmissions in order to facilitate the shifting of the clutch gears. The other feature is contained in that portion of the elecrical control circuit useful when the underarm is being used for a shaping operation. This feature is directed to automatically indexing or traversing the column after each shaping cycle of the underarm in order to accomplish a cutting operation over a surface of a workpiece.

In describing the gear shifting circuit, it may be helpful to review briefly the transmission 100 of the above-described machine tool. The spindle speed drive comprises basically a constant speed reversing type motor 59, an eight-speed change constant mesh transmission 101, a three-speed planetary transmission 102, and a two-speed transmission 103 including a high-speed gear 148 and a bullgear 146. Shifting of the eight-speed transmission 101 is accomplished by hydraulically actuated disc clutches 108, 109, 122, 123, 131, 132 controlled by a selector dial on the headstock face. The three-speed planetary transmission 102 and the two-speed transmission 103 is shifted by hydralic actuators 267, 268 respectively which are coupled to the shiftable elements or gear clutches of each transmission by conventional shifter rods and forks and are controlled by the speed selector dial and valve 204. Speed changes in the planetary two-speed transmissions can be preselected by setting the proper control valve dial to the desired speed range at any time. The shift is then accomplished by manually depressing an electrical control shift button on the control panel so as to energize the solenoid valve SV1 and apply pressure fluid to the actuators as determined by the control valve.

In order to facilitate shifting of the planetary and two-speed transmission clutch gears, a novel cycling arrangement is provided. While it is known in the art to intermittently impart rotary movement to the transmission gears to facilitate shifting, in many instances the two clutch gears to be meshed are lined up tooth-on-tooth and their engagement is prevented. By cycling the drive motor to rotate one of the pairs of meshing gears, it is sometimes possible to overcome this condition. See, for example, U.S. Patent No. 2,735,975. It has been found, however, that the clutch gear shifting can be substantially improved to relieve the condition of tooth-on-tooth by intermittently cycling the hydraulic gear shifting pressure alternately with the drive motor.

Referring to Fig. 14, a suitable electrical circuit for accomplishing the shifting is shown. Electrical energy is supplied to the circuit through power supply lines L1 and L2. When the clutch gears are to be shifted, the spindle clamp is released to close limit switch LS1, and the run-jog-shift selector switch S1 is placed in the shift position (Fig. 1) so that switch contact S1a (run) is open, S1b (jog) is open, and S1c (shift) is closed. Assuming that the gears are meshed for one spindle speed and it is desired to change the spindle speed, the speed control valve 204 is set to position the transmission 100 in the desired gear ratio. This will not have an immediate effect on either the planetary transmission 102 or the two-speed transmission 103 inasmuch as solenoid valve SV1 is closed. The spindle motor is set for right-hand rotation by positioning the selector switch S2 to open contacts S2a and close contacts S2b. Start button S is then pushed to energize relay R1, closing relay contact R1a to interlock relay R1 in the circuit and bypass the start button S. This condition will be maintained as long as relay R1 is energized and until the gears have moved into their new position.

Means are provided for determining when the transmission gear clutches are engaged and for terminating the shifting operation. One illustrative means for accomplishing this when the clutches of the planetary transmission 102 are meshed is shown in Fig. 9 and comprises a pair of limit switches LS16 and LS17 mounted on a partition in the headstock and which are held in the closed position whenever the reaction rings 138, 139 are disengaged from the stationary clutch gears 140, 141 or from the planet carrier 142. Each limit switch LS16 and LS17 is provided with a rocker arm 301, 302 for opening and closing its contacts. Extending from the hydraulic actuator guide rods 285, 286 and keyed thereto by discs 303, 304 secured to the ends of the rods are a pair of switch operating rods 305, 306. Formed on the end of each rod 305, 306 adjacent the rocker arms of the limit switches LS16, LS17 are a pair of spaced grooves or notches 308, 309 defining an intermediate raised or land area 310.

In order to close a limit switch LS16 or LS17 when a reaction ring is disengaged, the land area 310 cams the switch rocker arm to the switch-closed position. Correspondingly, when either of the rocker arms 301, 302 are complemental to the grooves 308 or 309, the reaction ring gears are engaged or clutched. A similar clutch engagement sensing device is provided for the two-speed transmission, limit switch LS18 being provided for this purpose.

For maintaining the shifting circuit energized so long as the gear clutches are disengaged, the limit switches LS16, LS17 and LS18 corresponding to each clutch are connected in parallel with each other and in series with relay R1. Thus, while at least one limit switch is closed, meaning at least one clutch has not been shifted into position, the shifting circuit is energized.

The shifting circuit and relay R1 is initially energized even though the transmission gear clutches or reaction gears are meshed, so that a new speed can be gained, through time delay opening relay contact R1c. This contact remains closed long enough after relay R1 and the shifting circuit including solenoid valve SV1 has been activated to initially shift the transmission to its new speed gearing.

Shifting of the gears while the spindle is rotating is prevented by a time delay closing relay R1b. This relay is timed to allow a sufficient amount of time to elapse after the selector switch S1 has been turned to the "shift" position (closing contacts S1c) and the start button S pushed to ensure that the spindle has been stopped by the electric brake 183 (Fig. 6). The solenoid valve SV1 can not be actuated to shift the gears until all spindle motion has stopped. This prevents damage to the clutch gear teeth in the transmission or to the transmission and headstock in case the speed shift is to much higher or much lower speed than the one in use at the time the shift is made.

For the purpose of intermittently energizing the solenoid valve SV1 and the spindle drive motor 59, a novel pulsing circuit is provided. Such a pulsing circuit illustrative of the present invention is shown in Fig. 14 and comprises a relay R2 energized when the start button S is pushed and contacts R1a and R1b are closed (L1—LS1—R1a—R1b—R2a—R2d—R2—L2). Simultaneously, solenoid valve SV1 is energized to shift the transmission clutch gears to the positions selected by the control valve 204. The valve SV1 remains energized for the duration of the pulse (L1—LS1—R1a—R1b—R2b—SV1—L2).

The length of time the hydraulic shifting pulse exists, i.e., the solenoid valve SV1 is energized, is determined by a time delay opening relay R2d in series with relay R2. As long as relay contact R2d is closed, SV1 is energized. When R2d opens, relay R2 is de-energized opening contacts R2b and breaking the circuit to SV1.

When the clutch gear shifting solenoid valve SV1 is de-energized, the drive motor circuit is completed as relay contact R2c closes (L1—LS1—R1a—R1b—R1d—R2c—S2b—C1—L2). Energization of motor contactor C1 closes contacts C1a, C1b, C1c. The drive motor 59 then rotates or jogs the gears of the transmission 100. This rotation continues until time-delay-closing relay R2a closes to energize relay R2 and repeat the pulsing cycle. As long as one of the limit switches LS16, LS17, LS18 is closed indicating that the shift is not complete, the cycling or pulsing continues.

The time duration of each pulse, determined by the time-delay-opening relay R2d and the time-delay-closing relay R2a is quite short, with the desirable effect being obtained of a jogging action of both the drive motor and the hydraulic shifter. The drive motor 59 thus never has an opportunity to pick up speed.

When the clutch gears have all been shifted into their newly selected positions, the limit switches are opened, and the shifting circuit relay R1 is de-energized to open relay contact R1a. The cycling operation is then completed and the machine tool is ready to operate at the new spindle speed.

By repeating the foregoing shifting operation, the gears in the machine tool transmission 100 can be automatically shifted to mesh in any selected position where they remain until a new speed selection has been chosen and the shift button is pushed to initiate the gear shifting cycle. A simple and foolproof gear shifting operation, which is completely automatic, is thus provided which is particularly desirable where, as in the foregoing machine tool, the clutches to be shifted are of the gear type.

The gear shifting circuit is applicable only when the main control panel on the headstock is employed. Furthermore, the gear shifting mechanism applies only when the spindle motor is set for righthand rotation by the proper positioning of the selector switch S2. When in the righthand rotation position, motor contactor C2 remains inoperative to prevent changing of the motor rotation direction during the shifting operation.

As another feature of the present invention, a shaping head (not shown) consisting of a clapper box and a single point shaping tool can be mounted on the end of the underarm 72 for performing shaping cuts on a workpiece when the underarm is reciprocated in and out of the headstock 50. In performing such operations, however, it is desirable to automatically feed the tool laterally of the workpiece in small increments so that successive cuts can be made without stopping the machine. It is, of course, possible to reciprocate the tool by moving the column on which the headstock is mounted by means of a hand crank. This leads to inaccuracies in the finished product and wastes a lot of time and energy on the part of the operator. It is, therefore, desirable to rotate automatically the column drive motor 317 (Fig. 16) to move the column.

In performing the shaping operation, the underarm, having the clapper box and tool attached thereto, is moved out of the headstock across the workpiece. At the end of the cut the underarm is reciprocated inwardly and at the innermost point of underarm travel the column is indexed a fixed amount to present a new portion of the workpiece to the cutting tool on the underarm. This is accomplished in accordance with the present invention by the electrical control circuit shown in Figs. 15 and 16. The purpose of this circuit is, when connected across electric supply lines L1 and L2, to control the out and in movements of the underarm as well as the indexing movement of the column.

In order to perform the shaping operation automatically, the shaping cycle switch S4 on the headstock is set to the automatic shaping position. The underarm clamp is then released by the foot pedal 76 and the clamp switch S8. The foot pedal is stepped on by the operator thereby closing the limit switch LS15 (Fig. 1). The underarm feed clutch 172 is then engaged, by moving the selector lever 192, to the underarm drive screw 95 (Fig. 6), simultaneously disengaging the spindle feed screw clutch 171 and closing the limit switch LS9 associated with the shifter fork 186.

To determine outer and inner limits of travel of the underarm when it is used for shaping, adjustable limit switch including an outer limit switch LS13 and an inner limit switch LS14 are mounted in the path of underarm travel (Fig. 1) for determining the movement of the underarm between its limits. In this particular instance the limit switches are operated by a pair of dogs 313 and 314 adjustably mounted on a dog ring 315 geared to the underarm feed mechanism (Fig. 1). The limit switches LS13 and LS14 are shown schematically in Fig. 11 for purposes of illustrating their action as outer and inner limit controls.

The underarm is translated in the shaping operation by the traverse portion of the feed transmission 166. In this operation, actuation of the traverse switch S6 energizes solenoid valves SV2 and traverse motor 167. Valve SV2 energizes the feed transmission to the traverse speed and declutches the feed rate portion operatively connected to the spindle drive transmission through gear 168. The direction of underarm movement is determined by appropirate clutches in the transmission under the control of solenoid valves SV3 and SV4 as described above. When valve SV3 is energized, pressure fluid is applied to the appropriate feed clutch for moving the underarm outwardly; on the other hand, valve SV4 controls the application of pressure fluid to the feed clutch for moving the underarm inwardly.

When the underarm reaches its present inner or outer limit of travel as determined by the limit switches LS13 and LS14, its direction is automatically reversed as will be described in greater detail below. The operation limit switch can be adjusted, of course, by positioning the dogs 313 and 314 on the dog ring 315.

Referring to Fig. 15, when limit switch LS9 is closed by engaging the underarm drive clutch, relays R4 and R5 are energized and remain energized for as long as LS9 is closed and the underarm feed drive is engaged. Under these conditions relays R4a and R5c are closed while relays R4b, R4c, R5a, and R5b are open. Relays R6 and R7 are thereby energized and their associated contacts are closed. The circuit is now set-up for automatic shaping operations.

To initiate operation of the shaping cycle, the traverse button S6 is depressed to close switch contacts S6a and S6b.

This energizes relays R8 and R10 which in turn close the circuits to underarm feed solenoid SV3 (L1—R5c—S5b—R8b—SV3—L2) the feed rate selector solenoid SV2 and the contactor C3 of the underarm drive motor

167 (L1—S6a—R10c—C3/SV2—L2). Energization of contactor C3 closes interlock relay C3d and the motor contacts C3a, C3b, C3d to rotate the motor 167 in the righthand direction. The underarm feeds outwardly of the headstock and the shaping tool performs a shaping cut on the workpiece adjacent the headstock.

To return the underarm at the completion of the shaping cut, limit switch LS13 is closed by the dog 313 on the dog ring 315 geared to the underarm drive. When closed, the outer limit switch LS13 energizes relay R11 to break the circuit to the drive clutch solenoid valve SV3 by opening relay contact R11c. Outward movement of the underarm stops and inward movement begins as relay R12 is energized (L1—R4a—R7a—R11a—R12—L2) and feed-in clutch solenoid valve SV4 is energized (L2—R5c—S5b—R7b—R12b—R10a—R13/SV4—L2). As R13 is energized, contact R13c holds contactor C3 energized, and the underarm drive motor 167 continues to rotate in the righthand direction to traverse the underarm inwardly. Relay contact R12a interlocks R12 in the circuit. Thus, when limit switch 13 is opened as the underarm begins its return stroke, relay R12 and the clutch solenoid valve SV4 remain active. The underarm moves inwardly until it completes its return stroke and the dog 314 on the dog ring 315 engages the inner limit switch LS14.

For purposes of automatically indexing the underarm shaper, the column drive motor 317 is started to shift the column carrying the underarm in response to the completion of the return stroke of the underarm shaper. The indexing distance is desirably determined by the length of time D.C. current is applied to the drive motor 317. This is accomplished by a timer circuit including a timed-to-open relay R15 and contacts R15a in series with the starter relay R16 for the motor.

Figure 16:
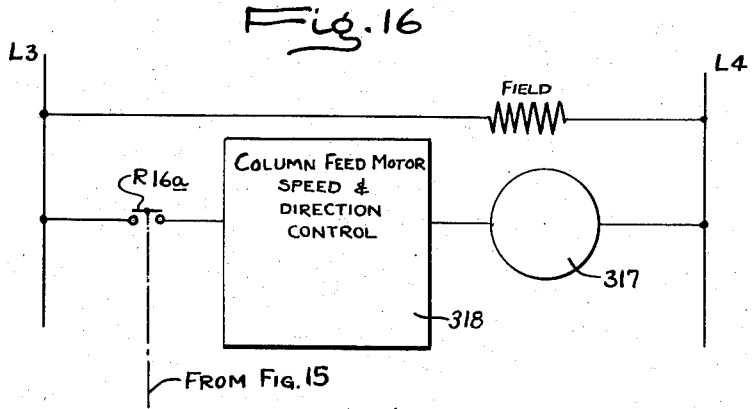
Fig. 16 is a wiring diagram showing that portion of the electrical control circuit for controlling movement of the column along its bed in response to signals from the circuit shown in Fig. 15.

Referring to Fig. 16, the column drive control circuit comprises the drive motor 317 and a speed and direction control unit 318 connected in series with the motor across D.C. lines L3 and L4. Closing starter relay contacts R16a initiates operation of the drive motor for indexing the column. When relay contact R15a opens after a predetermined time delay, starter relay R16 is de-energized and the column drive ceases. The length of time relay R15 is closed thus determines the index distance of the column.

As the underarm closes limit switch LS14, relay R14 closes contacts R14a to energize relays R15 and R16 and initiate the column indexing movement. When the column has been indexed the desired amount, the shaping cycle is repeated.

Means are provided to automatically renew the shaping operation by energizing the feed-out clutch solenoid valve SV3. One means comprises a relay contact R14c in parallel with the traverse button contact S6b, and serving, when closed by relay R14 to energize relay R8 and thereby solenoid valve SV3. The underarm, being at its innermost limit of travel during the indexing step, holds limit switch LS14 closed. When the outward stroke of the underarm begins, LS14 is opened and the shaping cycle is repeated.

*Summary*

It is believed that it would be helpful at this point to summarize the features of the improved headstock described above. This headstock 50 is adapted to be mounted on the machine tool cloumn 62 and carries journaled therein for rotary movement a sleeve 57 carrying an axially splined spindle 56. Beneath the sleeve and spindle assembly and in an integral portion of the headstock housing is an underarm 72 axially translatable into and out of the headstock. A thirty-two speed transmission 100 is provided for rotating the spindle sleeve 57 and a multi-speed transmission 166 is provided for axially translating or feeding the spindle and the underarm.

The spindle sleeve 57 is mounted for rotary movement in the headstock and a driving arrangement is provided between the sleeve and the transmission 100. For improving the transmission of rotary torque between the transmission and the spindle, an improved bullgear 146 is provided surrounding but spaced from the spindle sleeve and supported by bearings which are axially spaced from the spindle sleeve supporting bearings. The spindle sleeve is thus completely isolated from radial forces transmitted from the transmission gears to the bullgear. Furthermore, the slight annular space between the bullgear and the spindle sleeve effectively reduces the transmission of heat generated in the transmission to a negligible amount. The accuracy of the machining operations possible by the spindle carried in the improved headstock is thus substantially increased.

An improved spindle or underarm feed measuring device 194 has been provided which is geared directly to the feed transmission. The feed transmission is provided with a ball bearing nut and screw type feed mechanism in both the spindle and the underarm. It should be pointed out that feed mechanisms of this type, even though similar to a nut and screw arrangement, are relatively frictionless and the spindle or underarm can be moved in and out of the headstock even when the feed screw is stationary. The underarm and the spindle can thus be fastened together and, if a feed thrust is applied to one, the other will be pulled to follow the one to which the thrust is applied.

An improved hydraulic control system has been described which includes a simplified control panel arrangement including the use of concentric dials for the feed and speed adjustments. These concentric dials are keyed to control valves for controlling the application of pressure fluid to the various transmission shifting elements or actuators. A feed or speed may thus be preselected and, upon actuation of a suitable start button, the transmissions are shifted to effect the speeds and feeds desired.

To improve the action of a transmission shifting mechanism, an electrical jogging circuit which alternately rotates the transmission drive motor and applies a hydraulic shifting pressure to the clutch actuators is used. This jogging action has been found to greatly improve the operation of shifting the gear clutches by meshing them quickly, quietly and without damage.

A machine tool equipped with a headstock of the foregoing description is useful for many machining operations including both boring, drilling, milling as well as the added operation of shaping. This shaping operation is performed by the underarm and a control circuit for both reciprocating the underarm and indexing the column along its ways in order to traverse the underarm along the workpiece. A suitable electrical circuit is provided which may be adjusted to control the amount of indexing of the column, making the shaping operation completely automatic.

The underarm has many other uses such as for supporting the spindle at its greater extensions and for carrying a gear box for changing the direction of the cutting operation. One example of the latter is in the operation of a horizontal face mill for cutting the upper surface of a workpiece. This operation is accomplished by placing a right angle gear box on the end of the underarm and connecting it to the spindle and the face mill.

It is thus apparent that an improved headstock which is of strong and rigid construction and which is capable of a multitude of different machining operations at various speeds and feeds has been described. Such a headstock is constructed for accurate machining operations and is easily controlled by simple pushbutton, selector switch, and dial operations, either from a control panel on its face or from a portable control panel adjacent the machine. The machine headstock described is capable of both high speeds and high thrusts and is well adapted for automatic machining operations.

We claim as our invention:

1. A motor driven multi-speed, high torque power transmission for use in a machine tool headstock including a housing, spindle sleeve, a spindle, and bearings journaling said spindle sleeve in the housing, said transmission comprising, in combination, an eight-speed gear train and a three-speed planetary gear train, an output gear train, a low speed high torque bullgear surrounding the spindle sleeve and meshing with the said output gear, bearings journaling said bullgear in the headstock housing, said bullgear bearings being axially spaced from the spindle sleeve bearings, hydraulically operated disc clutches for selecting the speed output of the eight-speed transmission, gear clutches for selecting the speed output of said planetary transmission, a gear clutch for clutching said bullgear to the spindle sleeve, a high speed output gear rotatably mounted on said output shaft, a gear fixed to the spindle sleeve and meshing with said high speed output gear, a gear clutch for clutching said high speed gear to said output shaft, a hydraulic motor for selectively shifting said gear clutches for alternatively engaging said low speed bullgear or said high speed gear to drive the spindle sleeve, hydraulic motors for shifting said planetary gear clutches, a pair of multi-way control valves for selectively operating said hydraulic clutches and hydraulic motors respectively to determine the spindle speed, a pair of concentric dials operatively connected to respective ones of said valves for adjusting the same, one of said dials and valves serving to actuate selected ones of said disc clutches, the other of said dials and valves serving to actuate selected ones of said gear clutches, means operative when said control valves are adjusted to change the transmission output speed for intermittently pulsing the transmission motor drive to joggingly drive said output shaft and means for intermittently pulsing said hydraulic motors alternately with said drive motor pulsing means so that the gear clutches are properly engaged in their selected positions for driving the spindle at a selected speed as determined by the setting of said dials.

2. A pressure fluid controlled motor driven multi-speed, high torque power transmission for use in a machine tool headstock including a source of control pressure fluid, a housing having an opening in one end wall thereof, a spindle sleeve having one end extending into said opening, bearings journaling said spindle sleeve in said headstock, and a spindle mounted centrally of said spindle sleeve for axial translation relative thereto out of said headstock opening, and bearings within said opening for journaling the spindle sleeve at its one end, said transmission comprising, in combination, an output gear, a bullgear rotatably mounted on the spindle sleeve and meshing with said output gear, pressure fluid operated means for clutching said bullgear to the spindle sleeve to apply a spindle rotating torque thereto, bearings journaling said bullgear in the headstock housing, said bearings being axially spaced from the spindle sleeve bearings, means for intermittently jogging the drive motor to rotate said output gear, valve means including a finger selector dial keyed to a valve spool rotatably mounted in a valve housing for selectively directing pressure fluid from said source to said pressure fluid operated clutching means, means for intermittently applying said pressure fluid to said clutching means for intermittently pulsing the same alternately with said motor jogging means, and means for terminating the operation of said pulsing means when said bullgear is clutched to the spindle sleeve.

3. A motor driven multi-speed, high torque power transmission for driving a machine tool spindle mounted for axial translation within a spindle sleeve journaled in a machine tool headstock housing, said transmission comprising, in combination, speed gearing driven by the motor, an output gear driven by said speed gearing, a bullgear surrounding the spindle and meshing with said output gear, bearings journaling said bullgear in the headstock housing, said bullgear bearings being axially spaced from said spindle bearings, internal clutch teeth on said bullgear, a shiftable clutch gear surrounding said spindle and slidably mounted thereon, external clutch teeth on said clutch gear, and a shifter for coupling said bullgear to said spindle by sliding said shiftable clutch gear along said spindle to engage said internal and external clutch teeth whereby transmission of radial forces from said bullgear to said spindle is prevented.

4. A motor driven multi-speed, high torque transmission for driving a machine tool spindle mounted for axial translation with a spindle sleeve journaled in a machine tool headstock, said transmission comprising, in combination, speed gearing driven by the motor, an output gear driven by said speed gearing, a bullgear surrounding the spindle and meshing with said output gear, bearings journaling said bullgear in the headstock housing, said bullgear bearings being axially spaced from said spindle bearings, internal clutch teeth on said bullgear, a shiftable clutch gear surrounding said spindle and slidably mounted thereon, external clutch teeth on said clutch gear, and means for coupling said bullgear to said spindle by sliding said shiftable clutch gear along said spindle to engage said internal bullgear teeth and external clutch gear teeth, said coupling means including means for intermittently energizing the motor to drive said gears and means for intermittently sliding said shiftable clutch gear alternately with said intermittent motor energizing means so that said clutch is properly engaged, and means for terminating the operation of said intermittent motor energizing means when said clutch is engaged.

5. A motor driven high torque power mechanism for use in a machine tool headstock including a housing, a spindle sleeve, a spindle, and bearings journaling the sleeve in the housing, said transmission comprising, in combination, an output gear fixed on an output shaft, a low speed high torque bullgear surrounding the spindle sleeve and meshing with said output gear, bearings journaling said bullgear in the housing, said bullgear bearings being axially spaced from the spindle sleeve bearings, an axially slidable clutch splined to the spindle sleeve for clutching said bullgear thereto, a high speed output gear rotatably mounted on said output shaft, a gear fixed to the spindle sleeve and meshing with said high speed output gear, an axially slidable clutch splined to said output shaft for clutching said high speed gear to said output shaft, a shifter fork engaged with said clutches for selectively shifting said clutches to alternatively engage said low speed bullgear or said high speed gear to drive the spindle sleeve, means for intermittently pulsing the motor to joggingly drive said output shaft, and means for intermittently pulsing said shifter fork to engage one of said clutches alternately with said motor pulsing means so that the selected speed drive is properly clutched for driving the spindle at the selected speed.

6. A motor driven multi-speed, high torque power transmission for driving a machine tool spindle mounted for axial translation within a spindle sleeve journaled in a machine tool headstock housing, said transmission comprising, in combination, speed gearing driven by the motor, an output gear driven by said speed gearing, a bullgear surrounding the spindle and meshing with said output gear, bearings journaling said bullgear in the headstock housing, said bullgear bearings being axially spaced from said spindle bearings, internal clutch teeth on said bullgear, a shiftable clutch gear surrounding said spindle and slidably mounted thereon, external clutch teeth on said clutch gear, a pressure fluid operated shifter for coupling said bullgear to said spindle by sliding said shiftable clutch gear along said spindle to engage said internal and external clutch teeth, a valve for controlling the application of pressure fluid to said shifter comprising a valve spool rotatably mounted in a valve housing, a finger selector dial mounted on the housing for rotatably positioning said spool in said housing, and means including interengaging keys for operatively connecting said dial to said spool said keys preventing transmission of forces other than torque to said spool thereby preventing the spool from binding in said housing.

7. In a hydraulically controlled motor driven power transmission for use on a machine tool including a source of pressure fluid, the combination comprising a plurality of shiftable elements, pressure fluid actuated means for selectively shifting the elements, a valve housing having a pair of valve chambers therein, a valve spool rotatably mounted in each of said chambers and having a fluid-tight fit therewith, said spools having pressure fluid inlet and outlet passages extending axially therethrough and communicating with a plurality of axially spaced circumferential control grooves, said housing having a plurality of ports corresponding to said control grooves and communicating with various ones of the pressure fluid shifting means, concentric dials mounted on said housing, and means including interengaging keys rotatable about the axis of rotation of said spools to prevent transmission of radial forces to said spools for operatively connecting each dial to its respective valve spool so that rotation of said dials positions said valve spool control grooves in communication with various ones of said ports so as to selectively shift the transmission elements.

8. In a hydraulically controlled motor driven power transmission for use on a machine tool including a source of pressure fluid, the combination comprising a plurality of shiftable elements, pressure fluid actuated means for selectively shifting the elements, a valve housing having a pair of valve chambers therein, a valve spool rotatably mounted in each of said chambers and having a fluid-tight fit therewith, said spools having pressure fluid inlet and outlet passages extending axially therethrough and communicating with a plurality of axially spaced circumferential control grooves, said housing having a plurality of ports corresponding to said control grooves and communicating with various ones of the pressure fluid shifting means, concentric dials mounted on said housing, and means including interengaging keys rotatable about the axis of rotation of said spools to prevent transmission of radial forces to said spools for operatively connecting each dial to its respective valve spool so that rotation of said dials positions said valve spool control grooves in communication with various ones of said ports for directing pressure fluid to a selected shifting means, means for applying an intermittent fluid pressure from said source to said shifting means, means for intermittently energizing the motor alternately with said shifting means, and means for terminating the operation of said intermittent pressure and motor energizing means when said elements are shifted.

9. A motor driven multi-speed, high torque power transmission for driving a machine tool spindle mounted for axial translation within a spindle sleeve journaled in a machine tool headstock housing having an opening in one end wall thereof, the spindle extending through the opening and the spindle sleeve having one end extending into the opening and journaled therein by bearings, said transmission comprising, in combination, multi-speed gearing driven by the motor, an output gear driven by said speed gearing, a bullgear coaxial with the spindle sleeve and meshing with said output gear, said bullgear having a sleeve portion surrounding said spindle sleeve and extending within the headstock opening, bearings surrounding said bullgear sleeve portion for supporting said bullgear sleeve in said headstock opening, and means for clutching said bullgear to said spindle sleeve for applying a spindle rotating torque thereto, lateral deflecting forces exerted on said bullgear by said output gear during the application of spindle rotating torque being absorbed by the headstock housing through the bullgear mounting therein whereby such deflecting forces are not transmitted to the spindle.

10. A motor driven multi-speed power transmission for driving a machine tool spindle mounted for axial translation within a spindle sleeve journaled in a machine tool headstock housing having an opening in one end wall thereof, the spindle extending through the opening and the spindle sleeve having one end extending into the opening and journaled therein by bearings, said transmission comprising, in combination, multi-speed gearing driven by the motor, an output gear driven by said speed gearing, a bullgear coaxial with the spindle sleeve and meshing with said output gear, said bullgear having a sleeve portion surrounding said spindle sleeve and extending within the headstock opening, bearings surrounding said bullgear sleeve portion and axially spaced from the spindle sleeve bearings for supporting said bullgear sleeve in said headstock opening, and means for clutching said bullgear to said spindle sleeve applying a spindle rotating torque thereto, lateral deflecting forces exerted on said bullgear by said output gear during the application of spindle rotating torque being absorbed by the headstock housing through the bullgear mounting therein whereby such deflecting forces are not transmitted to the spindle.

11. A motor driven multi-speed power transmission for driving a machine tool spindle mounted for axial translation within a spindle sleeve journaled in a machine tool headstock housing having an opening in one end wall thereof, the spindle extending through the opening and the spindle sleeve having one end extending into the opening and journaled therein by bearings, said transmission comprising, in combination, multi-speed gearing driven by the motor, an output gear driven by said speed gearing, a bullgear coaxial with the spindle sleeve and meshing with said output gear, bearings journaling said bullgear in the headstock housing, said bearings being axially spaced from the spindle sleeve bearings, and means for clutching said bullgear to said spindle sleeve for applying a spindle rotating torque thereto, lateral deflecting forces exerted in said bullgear by said output gear during the application of spindle rotating torque being absorbed by the headstock housing through the bullgear mounting therein whereby such deflecting forces are not transmitted to the spindle.

12. In a multi-speed transmission driven by a motor and having a plurality of shiftable interengaging elements, the combination comprising, a movable control member, means for shifting said elements to any one of a plurality of predetermined positional patterns in response to adjustment of the control member to a corresponding one of a plurality of positions, means for intermittently pulsing the motor to drive said elements, means for intermittently pulsing said shifting means alternately with said motor pulsing means so that they properly engage in the predetermined pattern, and means for terminating the operation of said pulsing means when said elements are so engaged.

13. In a multi-speed transmission for use in a machine tool including a drive motor, the combination comprising a plurality of elements selectively shiftable to a plurality of engagement positions for varying the output speed of the transmission, means for selectively shifting said elements, and a control system for jogging the transmission elements as they are being shifted comprising a circuit including a time-delay-open relay and a time-delay-close relay interconnected to alternately time open and time close respectively, means for energizing the shifting means when said time-delay-open relay is energized, and means operative in response to the opening of said time-delay-open relay for energizing said time-delay-close relay and for energizing the drive motor, said motor being operative when said time-delay-close relay is energized for driving said transmission elements to facilitate shifting thereof.

14. In a multi-speed transmission for use in a machine tool including a drive motor, the combination comprising a plurality of elements selectively shiftable to a plurality of engagement positions for varying the output speed of the transmission, means for selectively shifting said elements, and a control system for jogging the transmission elements as they are being shifted comprising a circuit including two time delay relays interconnected to alternately time open and time close, means for energizing the shifting means when one of said time delay relays is energized and means operative in response to the deenergization of said one time delay relay for energizing said other time delay relay and for energizing the drive motor, said motor being operative while said other time delay relay is energized for driving said transmission elements to facilitate shifting thereof.

15. In a hydraulically controlled motor driven power transmission for a machine tool, a multiway valve for selectively operating said transmission and comprising a valve housing having a pair of valve chambers therein, a valve spool rotatably mounted in each of said chambers and having a fluid-tight fit therewith, a pair of concentric dials moutned on said housing for rotatably positioning respective ones of said spools in said chambers and means for operatively connecting a dial to its respective spool for rotating said spool in response to rotation of said dial, said means including interengaging keys for preventing the transmission of radial forces to said spools whereby binding of said spools in said chambers due to such radial forces is eliminated.

16. A pressure fluid controlled motor driven multi-speed power transmission for driving a machine tool spindle mounted for axial translation within a spindle sleeve journaled by bearings in a machine tool headstock housing, said transmission comprising, in combination, speed gearing including a low speed high torque output gear driven by the motor, a bullgear journaled in the housing by bearings and surrounding the spindle sleeve and meshing with said output gear, said bullgear bearings being axially spaced from the spindle sleeve bearings, a pressure fluid operated gear clutch for drivingly connecting said bullgear to the spindle sleeve, valve means for directing pressure fluid to the pressure fluid operated clutches, means for intermittently applying the pressure fluid to said clutch, means for intermittently jogging the motor to rotate the output gear alternately with the application of pressure fluid to said clutch, and means for terminating the application of pressure fluid and jogging of the motor when said bullgear is drivingly connected to the spindle sleeve for transmitting spindle rotating torque thereto without applying a spindle deflecting lateral force to the spindle sleeve.

References Cited in the file of this patent

UNITED STATES PATENTS

| | | |
|---|---|---|
| 1,604,488 | Seck | Oct. 26, 1926 |
| 2,012,082 | Hieber et al. | Aug. 20, 1935 |
| 2,062,994 | Higginson | Dec. 1, 1936 |
| 2,391,505 | Parker et al. | Dec. 25, 1945 |
| 2,548,188 | Armitage et al. | Apr. 10, 1951 |
| 2,674,925 | Berthiez | Apr. 13, 1954 |
| 2,685,823 | Kaiser | Aug. 10, 1954 |
| 2,757,557 | Hoffman | Aug. 7, 1956 |
| 2,772,582 | Gerst | Dec. 4, 1956 |
| 2,774,250 | Gallimore | Dec. 18, 1956 |